(12) United States Patent
Bondurant et al.

(10) Patent No.: US 8,140,787 B2
(45) Date of Patent: Mar. 20, 2012

(54) METHODS FOR IMPLEMENTATION OF AN ACTIVE ARCHIVE IN AN ARCHIVING SYSTEM AND MANAGING THE DATA IN THE ACTIVE ARCHIVE

(75) Inventors: Matthew D. Bondurant, Superior, CO (US); S. Christopher Alaimo, Boulder, CO (US); Randy Kerns, Boulder, CO (US)

(73) Assignee: Imation Corp., Oakdale, MN (US)

( * ) Notice: Subject to any disclaimer, the term of this patent is extended or adjusted under 35 U.S.C. 154(b) by 797 days.

(21) Appl. No.: 12/199,429

(22) Filed: Aug. 27, 2008

(65) Prior Publication Data

US 2009/0094424 A1    Apr. 9, 2009

Related U.S. Application Data

(60) Provisional application No. 60/977,761, filed on Oct. 5, 2007.

(51) Int. Cl.
*G06F 12/16*    (2006.01)

(52) U.S. Cl. ... 711/161; 711/129; 711/131; 711/E12.103
(58) Field of Classification Search ................. 711/161, 711/129, 131, E12.103
See application file for complete search history.

(56) References Cited

U.S. PATENT DOCUMENTS 5,802,363 A * 9/1998 Williams et al. .................. 713/2

* cited by examiner

*Primary Examiner* — Yong Choe
(74) *Attorney, Agent, or Firm* — Kenneth E. Levitt; Dorsey & Whitney LLP

(57) ABSTRACT

According to the disclosure, a unique and novel archiving system that provides one or more application layer partitions to archive data is disclosed. Embodiments include an active archive including a fixed storage. The active archive can create application layer partitions that associate the application layer partitions with portions of the fixed storage. Each application layer partition, in embodiments, has a separate set of controls that allow for customized storage of different data within a single archiving system. Further, embodiments of methods for ensuring storage capacity in the active archive and the application layer partitions within the active archive is also disclosed.

5 Claims, 18 Drawing Sheets

METHODS FOR IMPLEMENTATION OF AN ACTIVE ARCHIVE IN AN ARCHIVING SYSTEM AND MANAGING THE DATA IN THE ACTIVE ARCHIVE

CROSS-REFERENCES TO RELATED APPLICATIONS

This application claims priority to U.S. Provisional Patent Application Ser. No. 60/977,761, filed Oct. 5, 2007, entitled "METHODS FOR IMPLEMENTATION OF AN ACTIVE ARCHIVE IN AN ARCHIVING SYSTEM AND MANAGING THE DATA IN THE ACTIVE ARCHIVE," which is hereby incorporated herein in its entirety.

BACKGROUND OF THE INVENTION

Embodiments of the disclosure generally relate to storage systems and, more specifically, but not by way of limitation, to archiving storage systems.

An archiving storage system is used by one or more applications or application servers to store data for longer periods of time, for example, one year. Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage. However, at present, current archiving systems suffer from inadequacies.

Archiving systems in general do not have an easily accessible storage system that can allow a user to quickly retrieve archived data. Further, archiving systems generally allow requirements to be applied only over the entire archive. These requirements or controls ensure the data is stored under the guidelines provided by the outside organization, for example, SEC guidelines. However, some organizations may have data that is covered by more than one outside organization. Thus, some controls for the archive may relate to one outside organization's guidelines, for example, the SEC guidelines, while other controls may relate to a different outside organization, for example, Food and Drug Administration (FDA) guidelines. To compensate for the discrepancy in guidelines, the organization is forced to use the strictest guidelines or buy two archiving systems. The lack of customizability provides a less effective archiving system.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
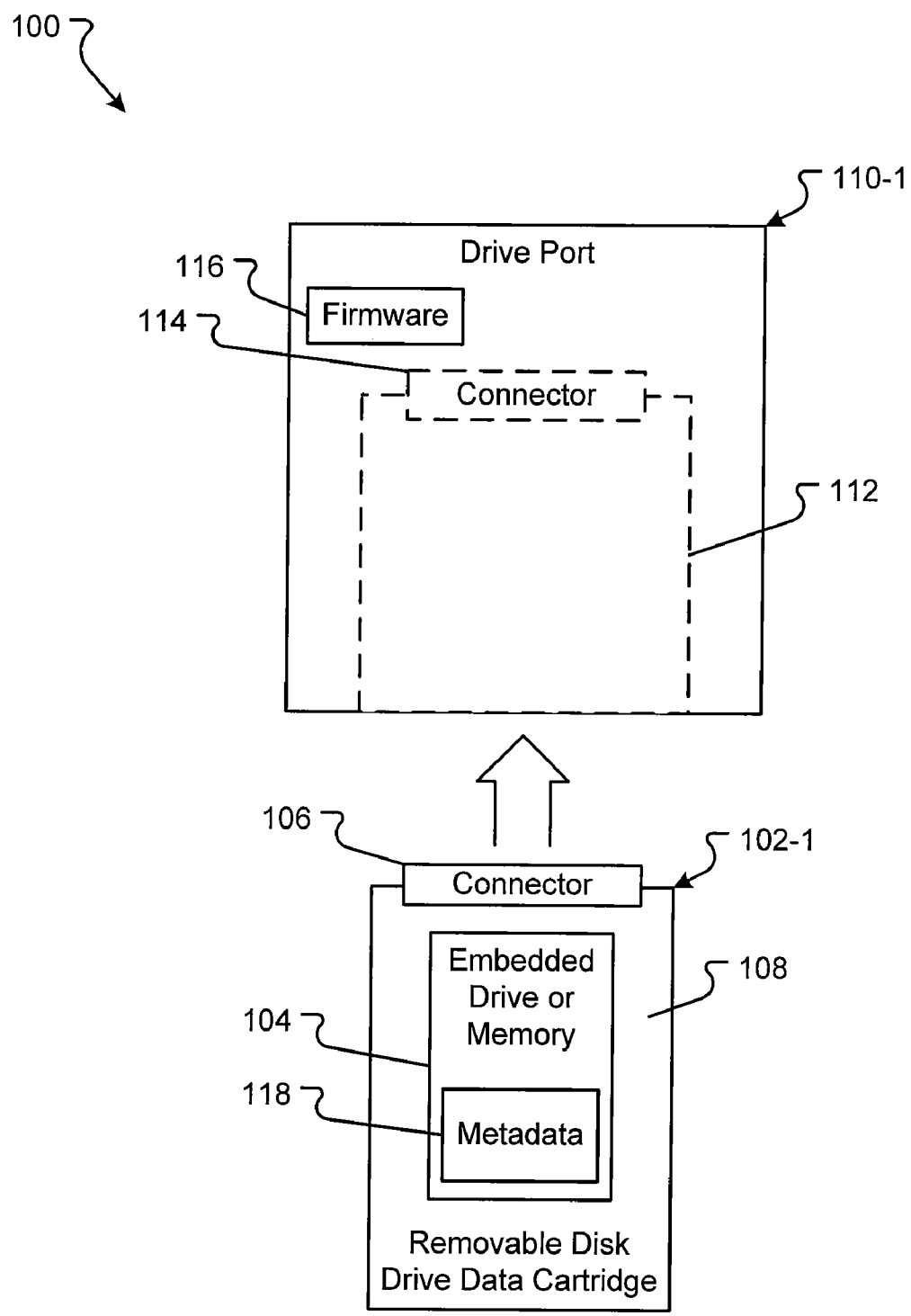
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides exemplary embodiment(s) only, and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present disclosure provide a unique and novel archiving system. Embodiments include an archiving system having hard disk drives embedded in removable disk cartridges, referred to simply as removable disk drives. The removable disk drives allow for expandability and replacement such that the archiving system need not be duplicated to add new or more storage capacity. Further, the removable disk drives provide advantages in speed and data access because, in embodiments, the data is stored and retrieved by random access rather than sequential access. In embodiments, the removable disk drives are electrically connected to one or more drive ports that are separately addressable. The archiving system can create application layer partitions that associate the application layer partitions with one or more drive ports. Each application layer partition, in embodiments, has a separate set of controls that allow for customized storage of different data within a single archiving system. These and further advantages will be evident to one skilled in the art from a review of the detailed description provided herein.

Further, the present disclosure generally provides an archiving system with an active archive. The active archive provides for short-term storage of archived data in a system where the archived data can be easily retrieved and provides information about files that have been removed from the active archive from a set of metadata about the file called a "stub." In embodiments, the active archive also includes one or more application layer partitions that mirror the application layer partitions created from the one or more removable disk drives. Embodiments of the active archive has limited storage capacity and eliminates of data from the active archive on a periodic basis. The present disclosure also generally provides systems and methods for eliminating data in the active archive.

An embodiment of a removable disk system 100 to provide long-term archival data storage is shown in FIG. 1. A removable disk drive 102-1 provides storage capability for the removable disk system 100. In embodiments, the removable disk drive 102-1 includes a data cartridge case 108 and an embedded memory 104, which may be an embedded hard disk drive (HDD), solid state disk (SSD), solid state drive, or flash memory. The HDD or flash memory 104 provides a random access memory for storage of archived data. The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component, and the connector protrudes from the data cartridge case 108. The data cartridge case 108, in embodiments, provides a solid container for the embedded memory 104 that also functions as an easily swappable or changed case when interchanging removable disk drives 102-1 in the removable disk system 100.

In embodiments, the removable disk system 100 contains a drive port 110-1 that includes one or more data cartridge ports 112, each with a data cartridge connector 114 to receive the removable disk drive 102-1. The data cartridge connector 114 mates with the electrical connector 106 of the removable disk drive 102-1 to provide an electrical connection to the removable disk drive 102-1 and/or to communicate with the embedded memory 104 in the removable disk drive 102-1. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the data cartridge case 108 of the removable disk drive 102-1 to be easily inserted and removed as necessary. In embodiments, the drive port 110-1 includes two or more data cartridge ports 112 to allow for the use, control and communication with two or more removable disk drives 102-1. Each drive port 110-1, in embodiments, is separately addressable to allow for customized control over each removable disk drive 102-1 connected to each data cartridge port 112. Thus, as removable disk drives 102-1 are replaced, the same controls can be applied to the newly inserted removable disk drives 102-1 because the drive port 110-1 is addressed instead of the removable disk drives 102-1.

The embedded memory 104, in embodiments, includes metadata 118 stored thereon. The metadata 118 can comprise one or more of, but is not limited to, cartridge and/or embedded memory 104 identification, encryption keys or data, other security information, information regarding data stored on the embedded memory 104, information about the data format used for the embedded memory 104, etc. The metadata 118 may be read and used by the firmware 116 of the drive port 110-1. The firmware 116 may be hardware and/or software resident in the drive port 110-1 for controlling the removable disk drive 102-1. In embodiments, the firmware 116 contains the necessary software and/or hardware to power-up the removable disk drive 102-1, spin-up the disk platters in the embedded memory 104, read and write to the embedded memory 104, read, write and process the metadata 118, etc. For example, the firmware 116 could read the metadata 118 to identify the removable disk drive 102-1 and gather information related to its contents.

In embodiments, the removable disk system 100 operates to receive one or more removable disk drives 102-1 in the one or more drive ports 110-1. The electrical connector 106 physically connects or couples with the data cartridge connector 114 to form an electrical connection that allows the drive port 110-1 to communicate with the embedded memory 104. The firmware 116 powers-up the embedded memory 104 and begins any initialization processes (e.g., security processes, identification processes, reading and/or writing to the metadata 118, etc.). The drive port 110-1, which, in embodiments, is in communication with a network, receives archival data from one or more servers, applications, or other devices or systems on the network. The firmware 116 writes the archival data to the embedded memory 104 of the removable disk drive 102-1 to archive the data.

Figure 2:
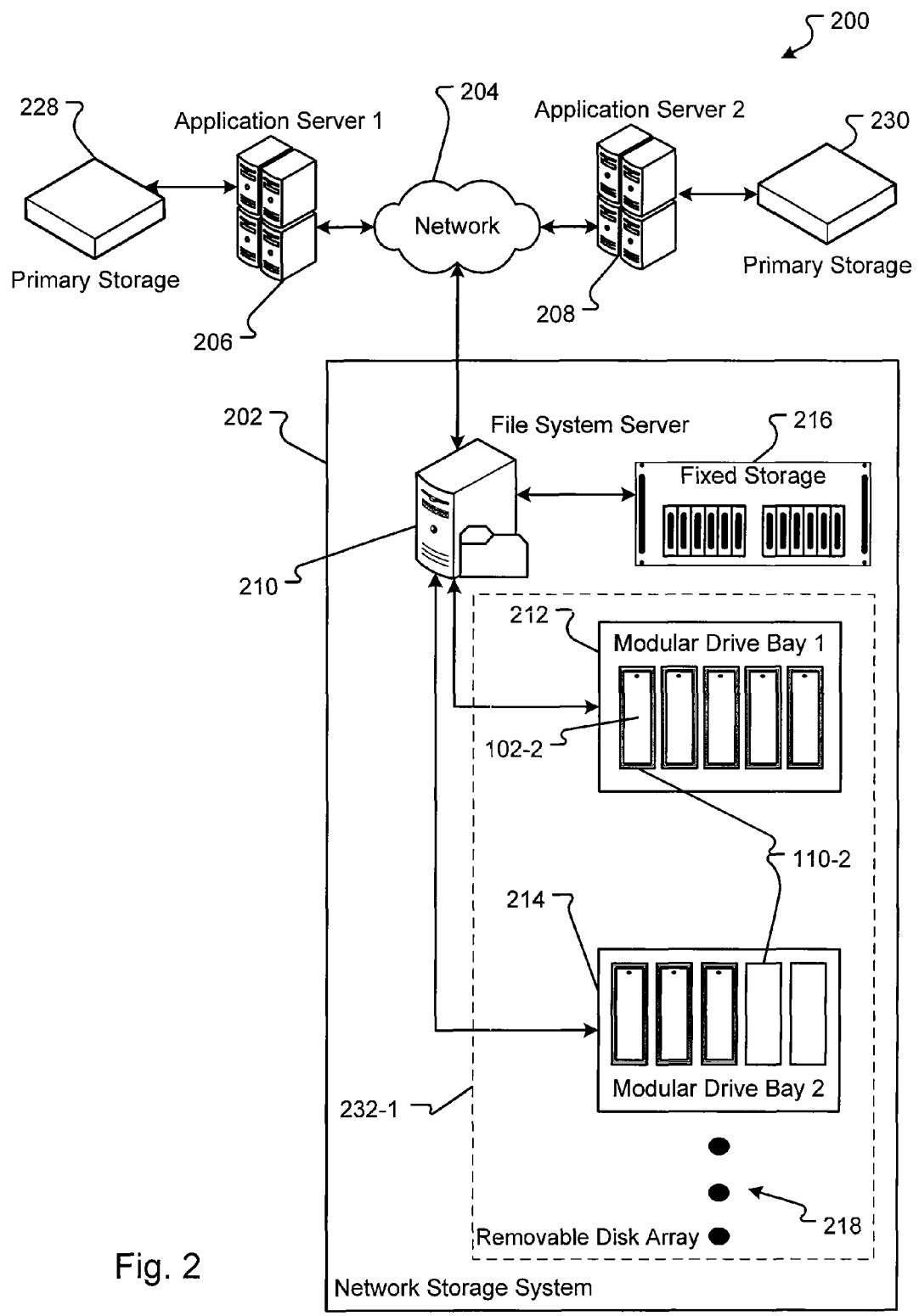
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes an archiving system appliance 210 and one or more removable disk drives 102-2 connected or in communication with a drive port 110-2. In alternative embodiments, a modular drive bay 212 and/or 214 includes two or more drive ports 110-2 that can each connect with a removable disk drive 102-2. Thus, the modular drive bays 212 and 214 provide added storage capacity because more than one removable disk drive 102-2 can be inserted and accessed using the same archiving system appliance 210. Further, each drive port 110-2 in the modular drive bays 212 and 214 are, in embodiments, separately addressable allowing the archiving system appliance 210 to configure the removable disk drives 102-2 in the modular drive bays 212 and 214 into groups of one or more removable disk drives 102-2. Two or more modular drive bays 212 and 214, in embodiments, are included in the network storage system 202, as evidenced by the ellipses 218. Thus, as more data storage capacity is required, more modular drive bays 212 and 214 may be added to the network storage system 202.

The exemplary hardware architecture in FIG. 2 provides near limitless capacity as more removable disk drives 102-2 can be added to existing modular drive bays 212 or 214 until the modular drive bays 212 and 214 hold all possible removable disk drives 102-2. Then, more modular drive bays 212 and 214 are added to the network storage system 202. Further, removable disk drives 102-2 may be replaced as the removable disk drives 102-2 near their storage capacity. The removed disk drives 102-2, in embodiments, are physically stored if and until the data on the removable disk drives 102-2 needs to be retrieved. If the data on the removable disk drive 102-2 needs to be retrieved, the removable disk drive 102-2 may be inserted into one of the drive ports 110-2 of the modular drive bay 212 or 214, and the information retrieved from the connected removable disk drive 102-2.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

The archiving system appliance 210, in embodiments, is a closed system that only allows access to the network storage system 202 by applications or other systems and excludes access by users. Thus, the archiving system appliance 210 provides protection to the network storage system 202.

In embodiments, the two or more modular drive bays 212 and/or 214, having each one or more inserted removable disk drives 102-2, form a removable disk array (RDA) 232-1. The archiving system appliance 210 can configure the RDA 232-1 into one or more independent file systems. Each application server 206 or 208 requiring archiving of data may be provided a view of the RDA 232-1 as one or more independent file systems. In embodiments, the archiving system appliance 210 logically partitions the RDA 232-1 and logically associates one or more drive ports 110-2 with each application layer partition. Thus, the one or more removable disk drives 102-2 comprising the application layer partition appears as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 102-2. For example, the application server 1 206 stores archival data in a first application layer drive, such as, the first three removable disk drives. The application layer drives are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 102-2. If the data is needed in the short term, the archiving system appliance 210 retrieves the data from the fixed storage 216.

The archiving system appliance 210 can also configure the active archive in the fixed storage 216 into one or more independent file systems, as with the RDA 232-1. As explained above, each application server may be provided a view of one of two or more independent file systems. Each independent file system may comprise an application layer partition in the RDA 232-1 and a related application layer partition in the fixed storage 216. In embodiments, the archiving system appliance 210 partitions the fixed storage 216 and associates each application layer partition in the fixed storage 216 with an associated application layer partition in the RDA 232-1.

As explained above, the archiving system appliance 210, in embodiments, determines where and how to store the data to one or more removable disk drives 102-2. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the related application layer partitions in both the fixed storage 216, the RDA 232-1, which may comprise one or more of the removable disk drives 102-2 in one or more of the drive ports 110-2. The archival data is written to the removable disk drive 102-2 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 102-2 and a different portion of the fixed storage 216 because the archival data from application server 2 208 relates to a different application and, thus, a different application layer partition.

Figure 3:
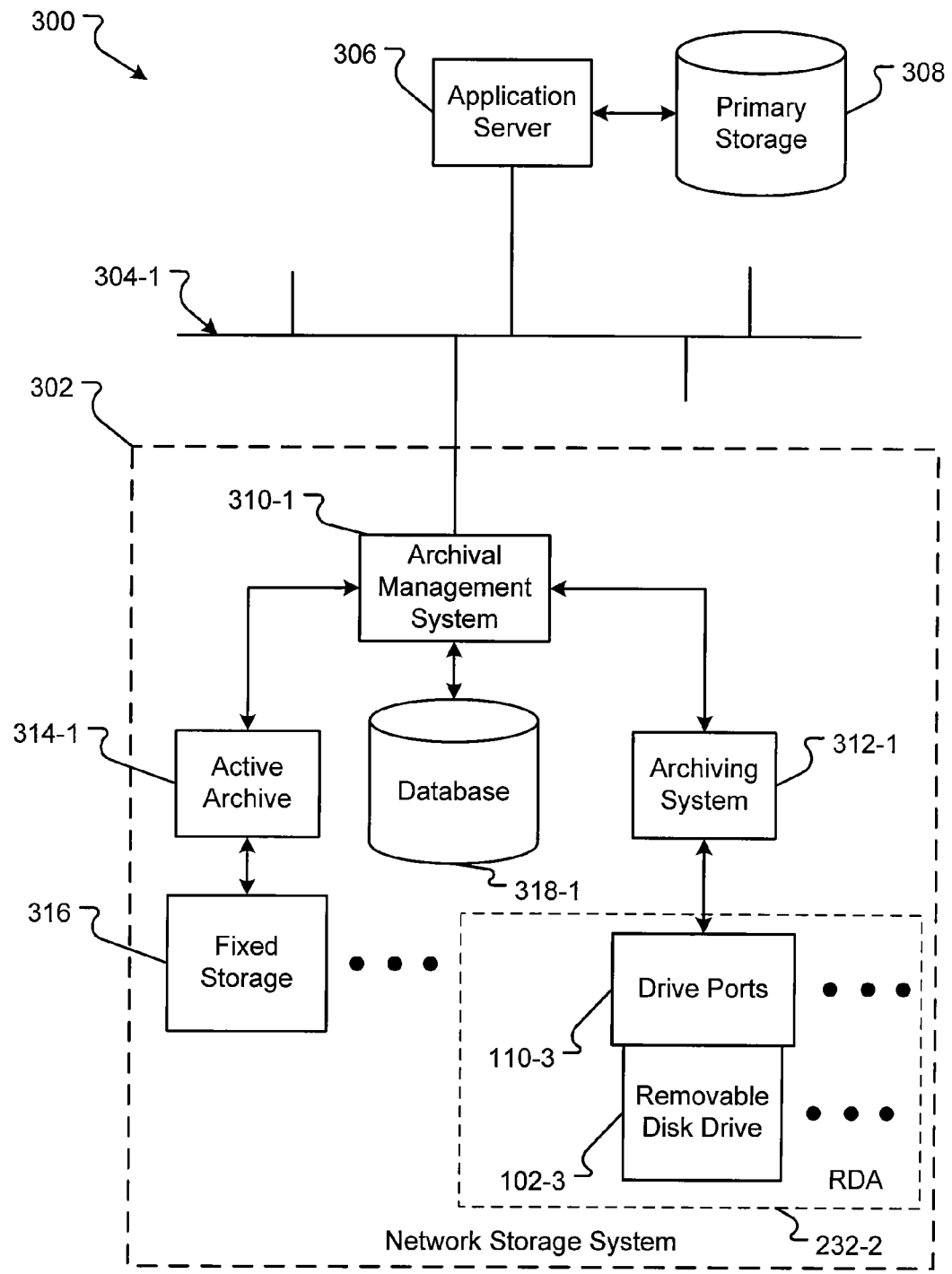
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304-1. The network 304-1 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304-1. For example, the network storage system 302 communicates with an application server 306. Communications between systems on the network 304-1 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312-1 in communication with one or more drive ports 110-3 that are in communication with one or more removable disk drives 102-3. The drive ports 110-3 and removable disk drives 102-3 are similar in function to those described in conjunction with FIG. 1. The archiving system 312-1 controls the function of the one or more drive ports 110-3 and writes the archived data to one or more predetermined removable disk drives 102-3 in the one or more drive ports 110-3.

In further embodiments, the network storage system 302 comprises an archival management system 310-1. The archival management system 310-1 receives data for archiving from one or more systems on the network 304-1. Further, the archival management system 310-1 determines to which system or removable disk drive 102-3 the data should be archived, in which format the data should be saved, and how to provide security for the network storage system 302. In embodiments, the archival management system 310-1 provides a partitioned archive such that the network storage system 302 appears to be an independent file system to each separate application server 306, yet maintains the archive for multiple application servers 306. Thus, the archival management system 310-1 manages the network storage system 302 as multiple, independent file systems for one or more application servers 306. In embodiments, the archival management system 310-1 and the archiving system 312-1 are functional components of the archiving system appliance 210 (FIG. 2).

In embodiments, the archival management system 310-1 saves archival data to both the archiving system 312-1 and an active archive 314-1. The active archive 314-1, in embodiments, controls, reads from and writes to one or more fixed storage devices 316 that allow easier access to archived data. In embodiments, fixed storage 316 is similar in function to fixed storage 216 (FIG. 2). The active archive 314-1 performs similar functions to the archiving system 312-1 but for the fixed storage devices 316. In embodiments, the active archive 314-1 and the fixed storage devices 316 are components of the hardware fixed storage system 216 (FIG. 2). In alternative embodiments, the active archive 314-1 partitions the fixed storage 316 to mirror the associated application layer partitions in the RDA 232-2. The application layer partition(s) in the active archive 314-1 may have boundaries associated with memory addresses in the fixed storage 316.

The archival management system 310-1 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310-1 can apply controls to different portions of the RDA 232-2 and the active archive 314-1 according to user-established data storage requirements. In one embodiment, the archival management system 310-1 creates application layer partitions in the archive that span one or more removable disk drives 102-3 and one or more portions of the fixed storage 316. All data to be stored in any one application layer partition can have the same requirements and controls. Thus, requirements for data storage are applied to different drive ports 110-2 (FIG. 2) in the modular drive bays 212 and 214 (FIG. 2) and to the removable disk drives 102-2 (FIG. 2) stored in those drive ports 110-2 (FIG. 2). Further, the requirements are likewise applied to different portions of the fixed storage 316 in the active archive 314-1. If a removable disk drive is replaced, the same storage requirements, in embodiments, are applied to the replacement removable disk drive 102-3 because of its location in the controlled drive port. As such, the archival management system 310-1 can individually maintain separate sets of data using different controls, even in different removable disk drives.

The network storage system 302 may also comprise a database 318-1 in communication with the archival management system 310-1. The database 318-1 is, in embodiments, a memory for storing information related to the data being archived. The database 318-1 may include HDDs, ROM, RAM or other memory either internal to the network storage system 302 and/or the archival management system 310-1 or separate as a discrete component addressable by the archival management system 310-1. The information stored in the database 318-1, in embodiments, includes one or more of, but is not limited to, data identification, application server identification, time of storage, removable disk drive identification, data format, encryption keys, application layer partition organization, etc.

The network 304-1, in embodiments, connects, couples, or otherwise allows communications between one or more other systems and the network storage system 302. For example, the application server 306 is connected to the network storage system 302 via the network 304-1. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304-1 to the network storage system 302. The data is received at the archival management system 310-1. The archival management system 310-1, in embodiments, sends the data to one or both of the active archive 314-1 and/or the archiving system 312-1 to be archived.

Figure 4:
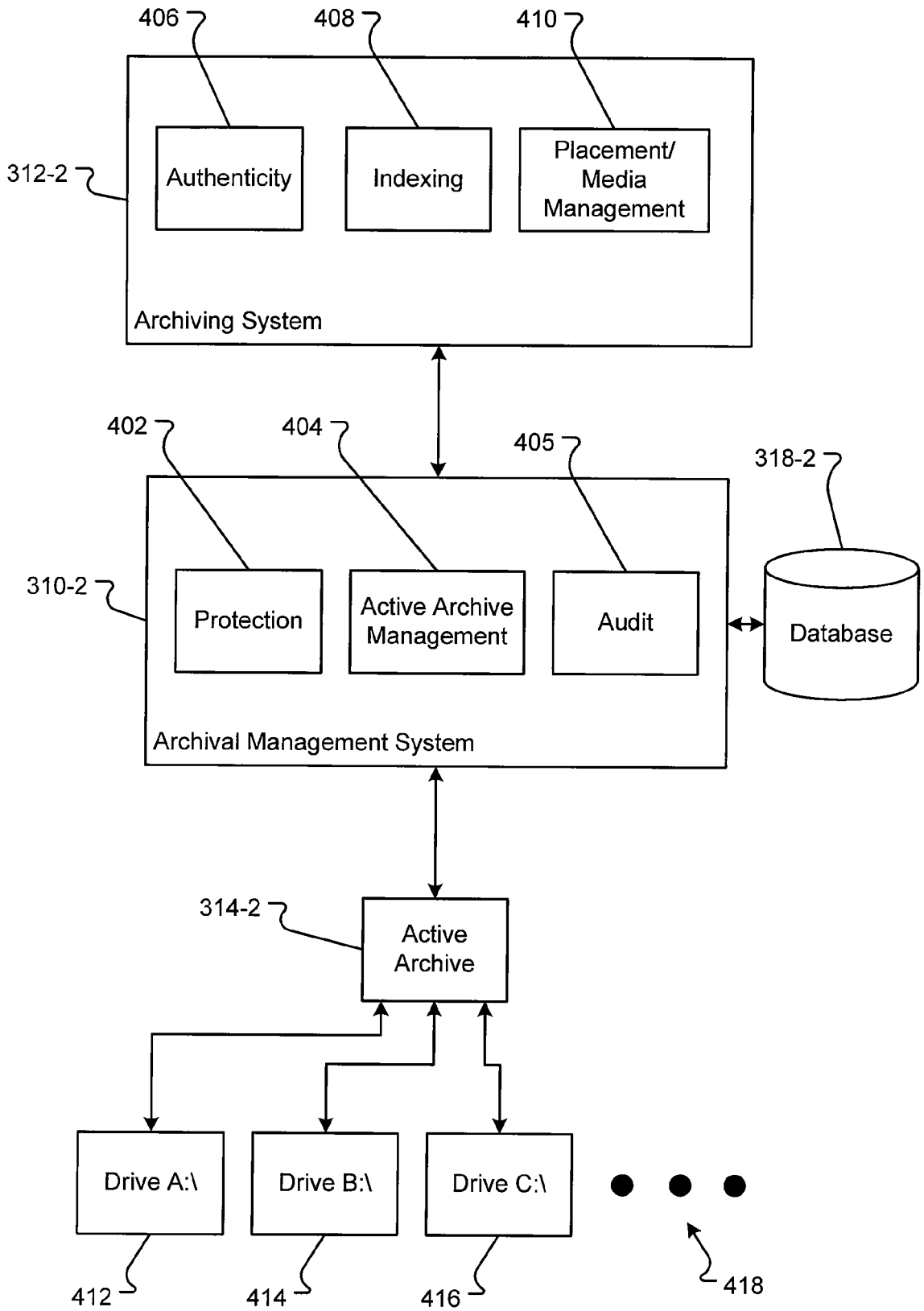
FIG. 4 is a block diagram of embodiments of an archival management system and an archiving system.

Embodiments of an archival management system 310-2 and an archiving system 312-2, including one or more components or modules, are shown in FIG. 4. In embodiments, the archival management system 310-2 comprises one or more of a protection module 402, an active archive management module 404, and an audit module 405. In embodiments, the protection module 402 protects access to the archiving system 302 (FIG. 3) by applications, application servers, or other components on the network. For example, the protection module 402 prohibits a user from accessing the archiving system 312-2 if the archiving system 312-2 is a closed system. Thus, the protection module 402 may authenticate a system, determine access rights of the system, perform decryption of data, and other processes.

The active archive management module 404, in embodiments, manages data written to and read from the active archive 314-2. In embodiments, the active archive management module 404 determines if archival data should be written to the active archive 314-2 based on information provided by the application server or on information stored in the database 318-2. In further embodiments, the active archive management module 404 determines when data in the active archive 314-2 is removed from the active archive 314-2, as explained in conjunction with FIGS. 6A-13. According to information in the database 318-2, one or more items of data may only reside in the active archive 314-2 for a predetermined period of time, for example, three months. After the expiration of the predetermined period of time, the data is removed from the active archive 314-2 and replaced with a "stub" containing metadata about the data leaving only the copy stored in the removable disk drive(s) for retrieval. The active archive management module 404 may also partition the active archive 314-2.

The audit module 405, in embodiments, stores data about the archival data stored in the archiving system 312-2 and active archive 314-2. In embodiments, the audit module 405 records information, for example, the application server that sent the data, when the data was received, the type of data, where in the archiving system 312-2 the data is stored, where in the active archive 314-2 the data is stored, the period of time the data will be stored in the active archive 314-2, etc. The audit module 405 can provide a "chain of custody" for the archived data by storing the information in the database 318-2.

The archiving system 312-2, in embodiments, includes one or more of an authenticity module 406, an indexing module 408 and/or a placement/media management module 410. In embodiments, the authenticity module 406 determines if a removable disk drive is safe to connect with the archiving system 312-2. For example, the authenticity module 406 may complete an authentication process, such as, AES 256, a public-key encryption process, or other authentication process, using one or more keys to verify that the inserted removable disk drive has access to the archiving system 312-2.

The indexing module 408, in embodiments, creates application layer partitions in the RDA 232-1 (FIG. 2) to provide storage areas for different data. For example, the indexing module 408 selects one or more removable disk drives to form one or more "drives". "Drive A:\" 412 may comprise one or more removable disk drives, while "Drive B:\" 414 and "Drive C:\" 416 may also include one or more removable disk drives. In embodiments, each drive is associated with an application layer partition of the RDA 232-1 (FIG. 2). There may be fewer than three application layer partitions of the RDA 232-1 (FIG. 2) or more than three application layer partitions of the RDA 232-1 (FIG. 2). In embodiments, each drive or application layer partition stores only a predetermined type of data that relates to one or more application servers. For example, Drive A:\ 412 stores email data, while Drive B:\ 414 stores Health Insurance Portability and Accountability Act (HIPAA) data.

In further embodiments, the active archive management module 404 creates application layer partitions in the active archive 314-2 that are associated with the application layer partitions in the RDA 232-1 (FIG. 2). For example, the active archive management module 404 selects portions of the active archive 314-2 to form one or more "drives" that are associated with the drive(s) in the RDA 232-1 (FIG. 2). In embodiments, the active archive's "Drive A:\" 412 is associated with Drive A:\ in the RDA 232-1 (FIG. 2), while "Drive B:\" 414 and "Drive C:\" 416 also are associated with Drive B:\ and Drive C:\, respectively, in the RDA 232-1 (FIG. 2). In embodiments, each active archive drive 412, 414 and 416 is associated with an application layer partition of the active archive 314-2. There may be fewer than three application layer partitions of the active archive 314-2 or more than three application layer partitions of the active archive 314-2, as represented by the ellipses 418. In embodiments, each drive or application layer partition stores the same type of data as the application layer partitions in the RDA 232-1 (FIG. 2). Continuing the example above, Drive A:\ 412 stores email data, while Drive B:\ 414 stores clinical trial data, which is the same as the application layer partitions in the RDA 232-1 (FIG. 2).

The application server(s) can view the application layer partitions in both the active archive 314-2 and the RDA 232-1 (FIG. 2) and, as such, views the active archive 314-2 and the RDA 232-1 (FIG. 2) as a virtual archiving system with a separate, independent drive inside the active archive 314-2 and the RDA 232-1 (FIG. 2) for the application server. One application server may only access the one or more drives related to the data the application server archives and may not access other drives not associated with the data the application server archives.

In further embodiments, the active archive management module 404 provides controls for each drive in the active archive 314-2. How data is archived for one type of data may be different from how a second type of data is archived. For example, an organization (e.g., the SEC) may require email to be stored for seven years while the Health and Human Services (HHS) may require HIPAA data to be stored for six (6) months. The active archive management module 404 can manage each drive differently to meet the requirements for the data. For example, the active archive management module 404 may store email on drive A:\ 412 for seven years and store HIPAA data on drive B:\ 414 for six months. The active archive management module 404, in embodiments, stores information about which portions of the active archive 314-2 comprise the separate application layer partitions and enforces the controls on those portions of the active archive 314-2. Other controls enforced by the active archive management module 404 may include the format of data stored on a drive, whether data is encrypted in the active archive 314-2, when and how data is erased from the active archive 314-2, etc. In a further embodiment, the indexing module 408 performs the same or similar functions for the RDA 232-1 (FIG. 2).

In embodiments, the placement/media management module 410 manages the removable disk drives in the RDA 232-1 (FIG. 2). For example, the placement/media management module 410 determines when cartridges need replacing because the removable disk drive is at or near capacity. In embodiments, the placement/media management module 410 also separately addresses the removable disk drives and provides the addressing information to the indexing module 408 for storing data in the correct application layer partition.

Some organizations require that archived data be immutable, that is, the data cannot be overwritten or deleted for a period of time. To ensure data stored in the RDA 232-1 (FIG. 2) is immutable, the placement/media management module 410, in embodiments, enforces a Write Once Read Many (WORM) process on the removable disk drives storing immutable data. The WORM process may comprise one or more functions that write data to the removable disk drive in a manner that prevents it from being overwritten, e.g., write protection, sequential writing to disk, etc. Data for an application layer partition may require WORM enforcement according to the indexing module 408. The placement/media management module 410 can determine what removable disk drives are associated with the application layer partition needing WORM enforcement and enforce the WORM process on the removable disk drives associated with the application layer partition.

Figure 5A:
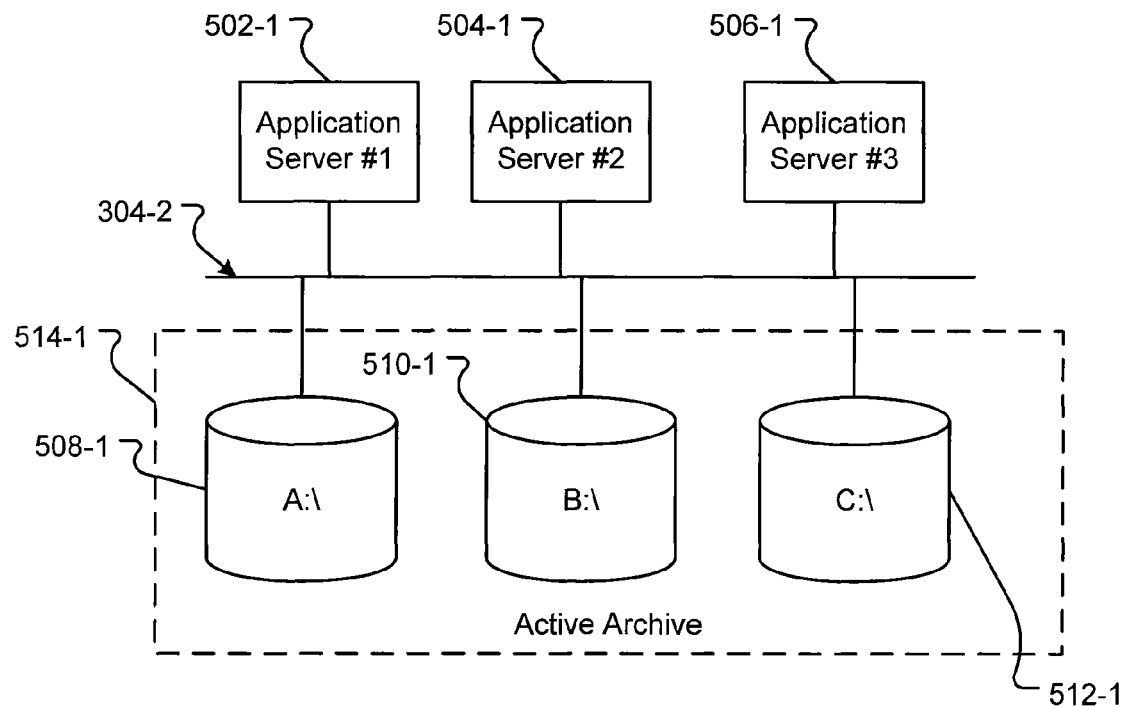
FIGS. 5A-C are block diagrams of embodiments of an archiving system providing multiple, independent file systems.
Figure 5B:
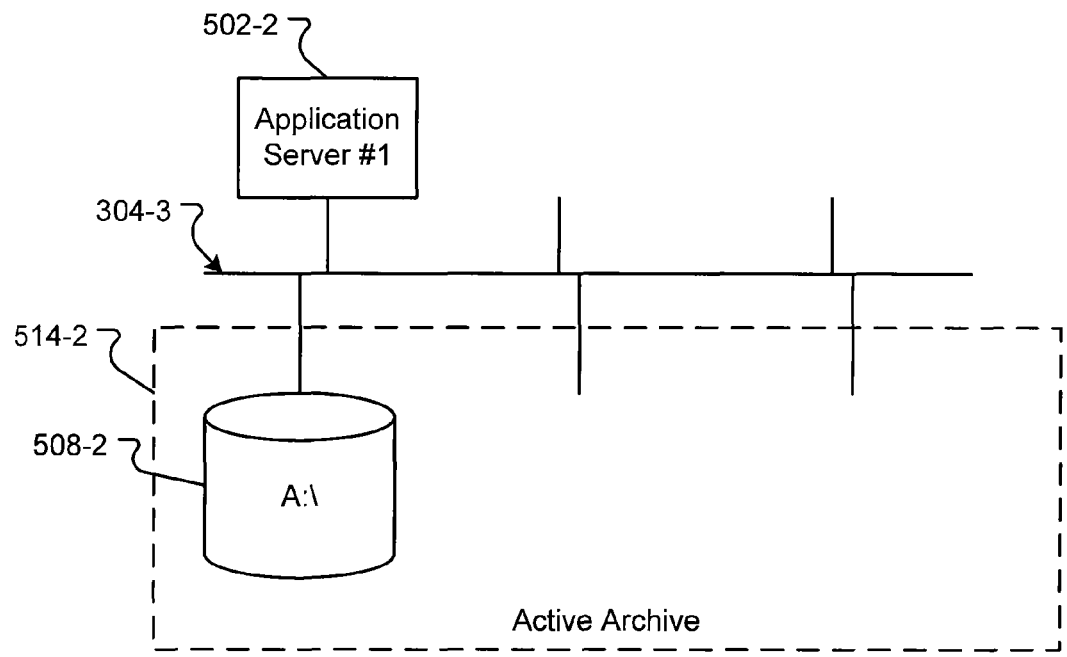
Figure 5C:
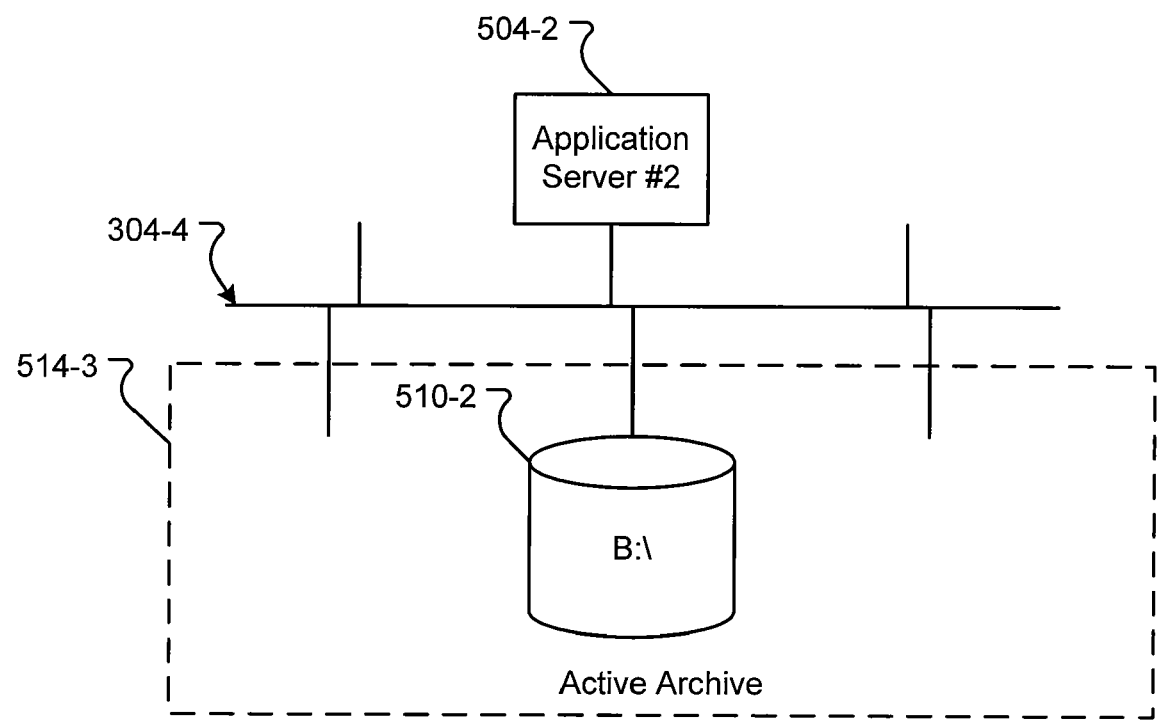

As explained in conjunction with FIG. 4, the network storage system 302 (FIG. 3) can present the archive as multiple, independent file systems. Block diagrams showing embodiments of the multiple, independent file systems are shown in FIGS. 5A-5C. The network storage system 302-2 is in communication with the network 304-2. In embodiments, one or more application servers, such as application server 1 502-1, application server 2 504-1 and application server 3 506, are also in communication with the network 304-2 and can send archival data to the network storage system 302-2 via the network 304-2. The network storage system 302-2 may include an RDA with one or more removable disk drives and, in some embodiments, an active archive 514-1. The active archive 514-1, in embodiments, is partitioned to create one or more application layer partitions, such as application layer partition 508-1, 510-1 and 512. In embodiments, the application layer partitions are viewed as storage drives that an application server can request to have mounted to archive data. For example, application layer partition 1 508-1 is labeled drive "A:\", while application layer partition 2 510-1 is labeled drive "B:\" and application layer partition 3 512 is labeled drive "C:\". Other labels may be used for the application layer partitions, for example, a globally unique identifier (GUID) or other identifier may be used to identify the application layer partitions. In the examples shown in FIGS. 5A-5C, the drive labels will be used but these examples are not meant to limit the embodiments to that type of label or identifier for the application layer partitions.

In embodiments, each application server 502-1, 504-1 and 506 only has access and "sees" only the application layer partition into which that application server 502-1, 504-1 or 506 archives data. For example, with regard to FIG. 5B, application server 1 502-2 only accesses application layer partition 508-2 in the active archive 514-2. As such, to application server 1 502-2, the active archive 514-2 may only consist of a single file system. The application server 1 502-2, in embodiments, asks for drive A:\ to be mounted and sends archival data over the network 304-3 to only drive A:\. The application server 1 502-2 cannot send data to other drives.

Likewise, application server 2 504-2, in embodiments, only accesses application layer partition 510-2, as shown in FIG. 5C. Thus, the network storage system 302-4 also appears as only one file system to application server 2 504-2. Application server 2 504-2 may only send data to drive B:\ 510-2 over the network 304-4. Application server 2 504-2, in embodiments, does not recognize that other file systems are included in the active archive 514-3. By partitioning the active archive 514-1, the active archive 514-3 can include multiple file systems and can operate as independent file systems for each application server storing archival data.

Figure 6A:
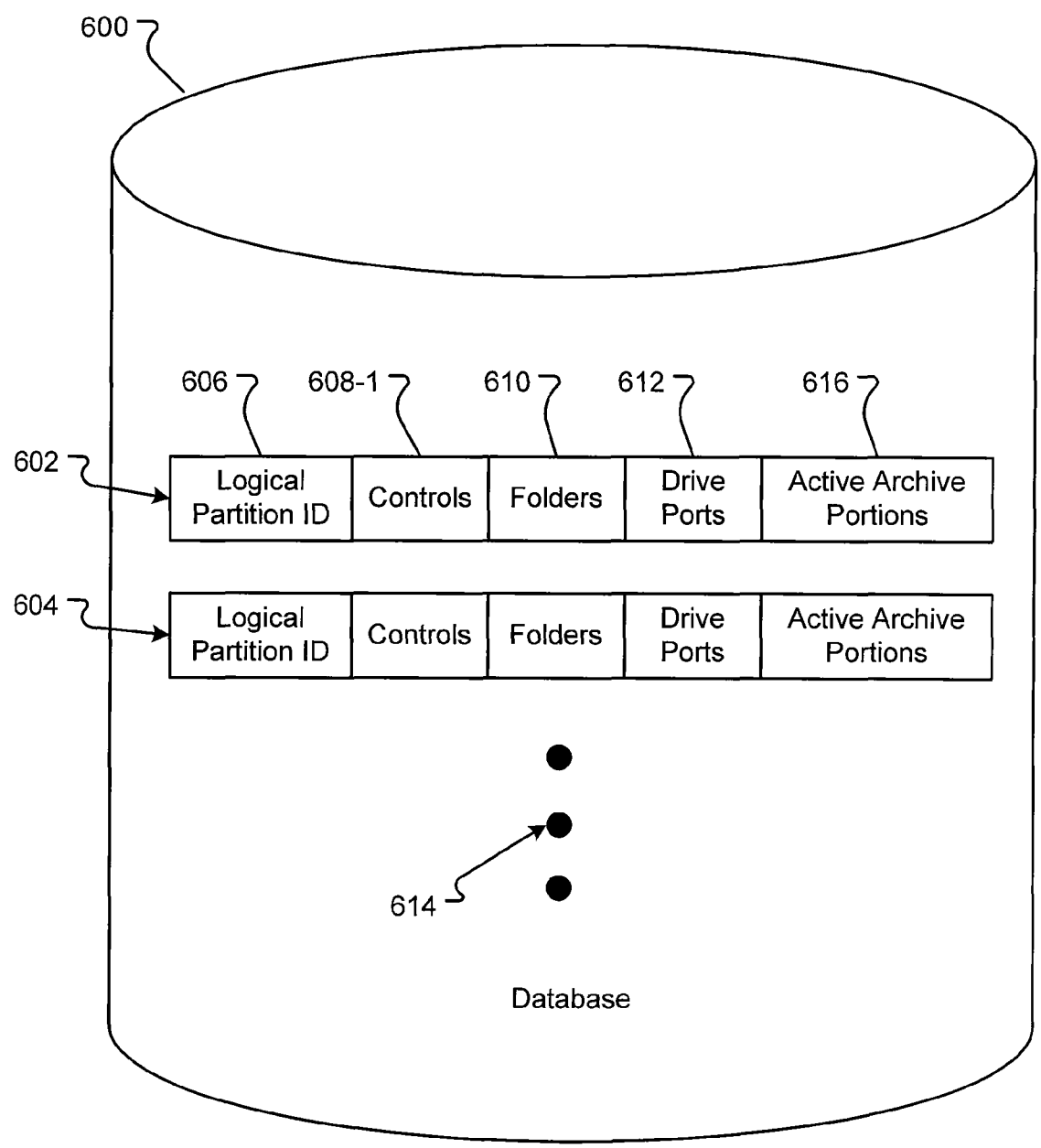
FIGS. 6A-B are block diagrams of embodiments for data structures representing application layer partitions.
Figure 6B:
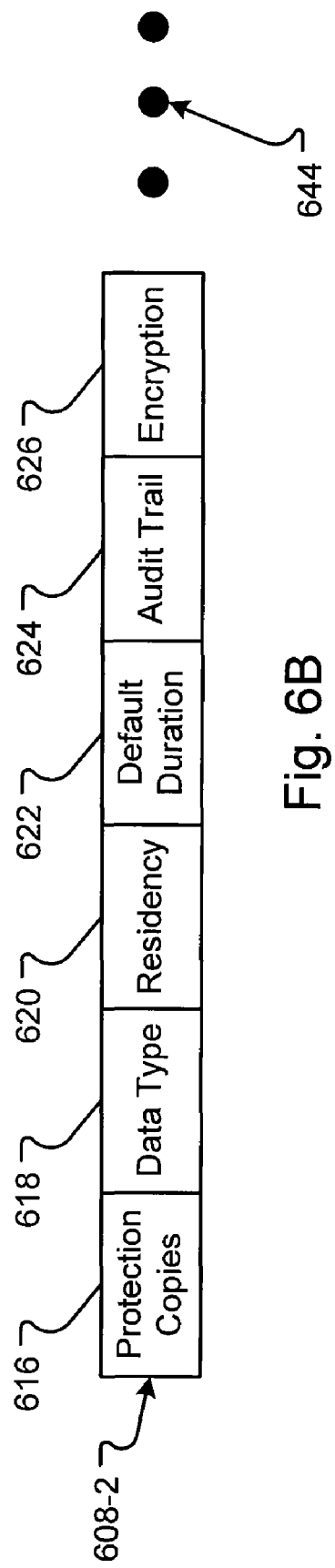

Embodiments of a database 600 comprising one or more data structures for organizing the network storage system into application layer partitions is shown in FIGS. 6A-6B. In embodiments, the database 600 is similar or the same as database 318-1 (FIG. 3). The database 600 can be a partition table or other data structure for storing the information described herein. In an embodiment, the database 600 includes one or more application layer partition fields 602 and 604 that represent the application layer partitions in the RDA and the active archive. There may be fewer or more than two application layer partition fields as represented by the ellipses 614. Each application layer partition field 602 or 604 may have one or more fields representing data about the application layer partition represented by the application layer partition fields 602 or 604.

In embodiments, an application layer partition field 602 may comprise one or more of, but is not limited to, an application layer partition identification field 606, one or more control fields 608-1, one or more drive port fields 612, and/or one or more active archive portions fields 616. In alternative embodiments, the application layer partition field 602 also includes one or more folder fields 610-1. The application layer partition identification field 606, in embodiments, includes an identification that can be used by an application server 502-1 (FIG. 5A) to send data to the application layer partition represented by the application layer partition field 602. In one embodiment, the identification is a GUID for the application layer partition. In another embodiment, the identification is the drive letter assigned to the application layer partition. For example, application layer partition field 602 represents application layer partition 1 508-1 (FIG. 5A), and the application layer partition identification field 606 would be drive letter "A:\".

Further embodiments of the application layer partition field 602 includes one or more drive port fields 612. In embodiments, the one or more drive port fields 612 associate one or more drive ports 602 (FIG. 6) with the application layer partition 508-1 (FIG. 5A). The association may include listing the one or more interface addresses for the one or more drive ports in the one or more drive port fields 612. In other embodiments, a drive port is assigned a slot number or identification. The slot number may then be stored in the drive port field 612. The drive port fields 612 can be used by the network storage system to address archival data to one or more removable disk drives electrically connected to the one or more drive ports.

Embodiments of the application layer partition field 602 may also include one or more active archive portion fields 616. In embodiments, the one or more active archive portion fields 616 associate one or more portions of the active archive 314-2 (FIG. 4) with the application layer partition 508-2 (FIG. 5B). The association may include listing the one or more memory addresses in the fixed storage 216 (FIG. 2). The memory addresses may comprise one memory address and one or more offsets. The memory bounded by and or including the memory addresses represent the allowed memory space for the application layer partition. The active archive portion fields 612 can be used by the network storage system to address archival data to one or more portions of the active archive 314-2 (FIG. 4).

One or more control fields 608-1 and one or more folder fields 610-1, in embodiments, are also included in the application layer partition field 602. The control fields 608-1 provide one or more controls for the application layer partition represented by the application layer partition field 602. Likewise, the folder fields 610-1 provide a designation of one or more folders that can be used for storing data in the application layer partition represented by the application layer partition field 602. Embodiments of the control fields 608-1 are further described in conjunction with FIG. 8B.

An embodiment of one or more control fields 608-2 is shown in FIG. 6B. The control fields 608-2 may include one or more of, but are not limited to, a protection copies field 616, a data type field 618, a residency field 620, a default duration field 622, an audit trail field 624, an encryption field 626, and an inherit field 628. The protection copies field 616, in embodiments, includes a number of copies that need to be kept of the data. For example, if there is a two (2) in the protection copies field 616, two copies of the application layer partition or of the data within the application layer partition is maintained in the active archive and the RDA.

The data type field 618, in embodiments, represents how the data is maintained. For example, the data type field 618 includes a designation that the data in the application layer partition is WORM data. As such, all data in the application layer partition is provided WORM protection. In alternative embodiments, the data type field 618 may also describe the type of data stored, such as, email data, HIPAA data, etc.

In embodiments, the residency field 620 is the storage requirements for the data in the active archive. The data in the active archive can have a residency time, a duration the data is kept in the active archive, that is different from the time the data is kept in the RDA. For example, the data in the active archive may be kept for three (3) months, while the same data stored in the RDA stays in the RDA for two (2) years. Further, some data in the active archive can be permanent residency data, data that is never deleted from the active archive. A flag, in embodiments, is set in the residency field 620 to represent the data as permanent residency data.

The default duration field 622, in embodiments, sets a duration for maintaining the data in the RDA. For example, an outside organization may require the data in the application layer partition to be maintained for six (6) months. The default duration field 622 is set to six months to recognize this limitation.

The audit trail field 624, in embodiments, is a flag that, if set, requires an audit trail to be recorded for the data. In embodiments, the audit trail includes a log or record of every action performed in the RDA or active archive that is associated with the data. For example, the time the data was stored, any access of the data, any revision to the data, or the time the data was removed would be recorded in the audit trail. In other embodiments, the audit trail field 624 comprises the record or log of the audit trail.

In embodiments, the encryption field 626 comprises a flag of whether the data in the application layer partition is encrypted. If the flag is set, the data is encrypted before storing the data into the RDA or the active archive. In alternative embodiments, the encryption field 626 also includes the type of encryption, for example, AES 256, the public key used in the encryption, etc., and/or the keys for encryption.

An inherit field 628, in embodiments, comprises a flag that, if set, requires that all folders in the application layer partition use the controls set in the application layer partition field 608-2. In embodiments, the inheritance flag 628 represents that only those controls that are set are inherited by a folder in the application layer partition. In other embodiments, if the flag is set, the folders use the controls in the folder fields 610 instead of the controls in the application layer partition field 608-2. The ellipses 644 represent that other controls may exist.

Figures 7A, 7B:
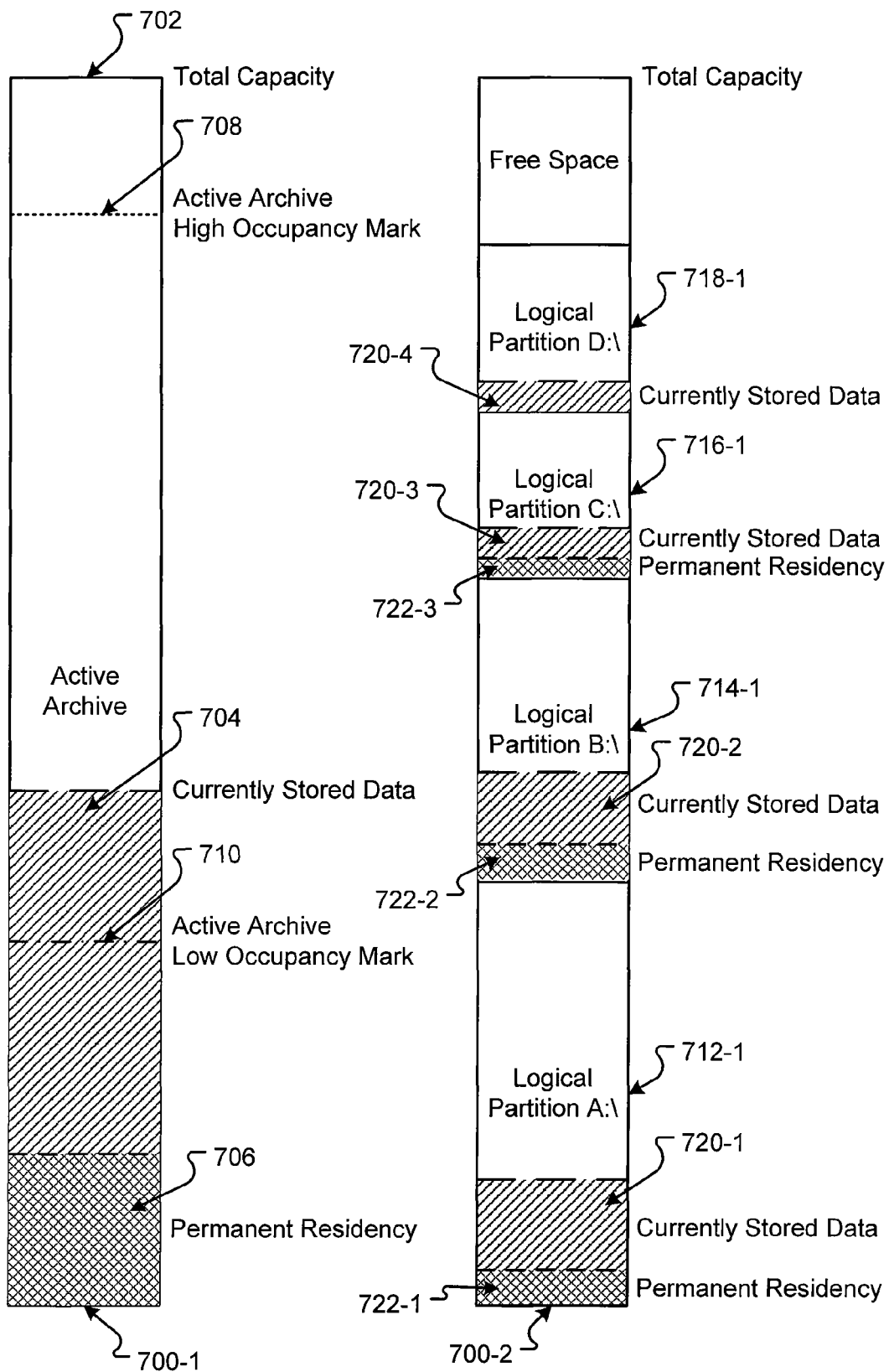
FIGS. 7A-C are bar diagrams of an embodiment of an archiving system showing storage of data in the archiving system.
Figure 7C:
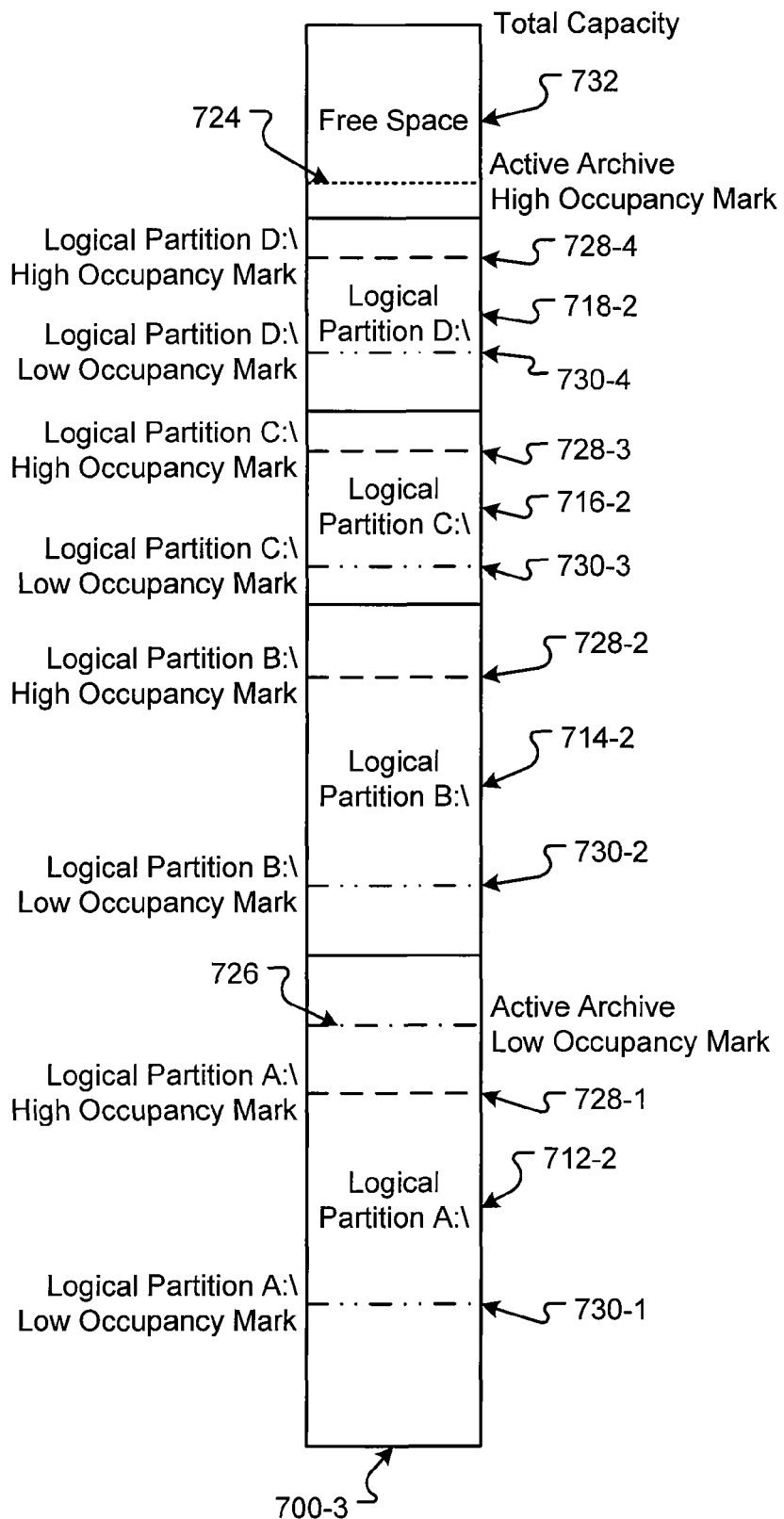

Bar diagrams representing embodiments of the memory in an active archive 700 are shown in FIGS. 7A-C. The bar diagrams represent the amount of total storage capacity in the active archive 700 where the bottom of the diagram represents the first memory address and the top of the bar diagram represents the last memory address and the total capacity 702 for the active archive. The total storage capacity may consist of the storage capacity of one or more memories, for example, four HDDs.

The amount of archived data currently stored in the active archive 700-1 is represented by the currently stored data bar

704. The currently stored data bar 704 represents how much of the total capacity 702 is currently being used by archived data. A portion of the currently stored data 704 may be permanent residency data represented by the permanent residency bar 706. Permanent residency data may be any data that should not be removed from the active archive 700 and that should be available for access permanently.

In embodiments, one or more limits or marks are created to determine when data in the active archive 700 should be removed and replaced with a stub or eliminated. For example, an active archive high occupancy mark (HOM) 708 is a percentage of the total capacity 702 of the active archive 700-1. If the amount of the currently stored data 704 is a greater percentage of the total capacity 702 of the active archive 700-1 than the active archive HOM 708, then some archived data may need to be eliminated. For example, if the currently stored data 704 is 90% of the total capacity 702 of the active archive 700-1 and the active archive HOM 708 is set at 85%, then archived data needs to be eliminated. Hereinafter, the currently stored data 704 will be said to cross over the active archive HOM 708 when the percentage of storage used by the currently stored data 704 is more than the percentage set for the active archive HOM 708.

An active archive low occupancy mark (LOM) 710, in embodiments, represents another set percentage of the total capacity 702 of the active archive 700-1. Unlike the active archive HOM 708, the active archive LOM 710 represents a threshold for when removal of archived data should stop. In other words, if the active archive HOM 708 is crossed over, archived data in the active archive 700-1 is removed. The process for removing the archived data should continue until the currently stored data 704 is less than the active archive LOM 710. Once the active archive LOM 710 is, in embodiments, crossed over, the removal of archived data stops.

Another embodiment of the active archive 700-2 is shown in FIG. 7B. In this example, the active archive 700-2 is partitioned into four (4) application layer partitions: application layer partition A:\ 712-1, application layer partition B:\ 714-1, application layer partition C:\ 716-1, and application layer partition D:\ 718-1. There may be more or fewer application layer partitions in the active archive 700. In embodiments, each application layer partition 712-1, 714-1, 716-1, or 718-1 has an amount of currently stored data 720-1, 720-2, 720-3, 720-4. In one or more application layer partitions, part of the currently stored data 720 may be permanent residency data 722-1, 722-2, 722-3. In one embodiment, to determine if the currently stored data 720 is greater than the active archive HOM 708, the percentage of each of the application layer partitions currently stored data 720 is added and compared to the active archive HOM 708. A similar process may be used to determine if the currently stored data 720 is lower than the active archive LOM 708.

Still another embodiment of the active archive 700-3 is shown in FIG. 7C. In the exemplary embodiment, the active archive 700-3 is again partitioned into four (4) different application layer partitions: application layer partition A:\ 712-2, application layer partition B:\ 714-2, application layer partition C:\ 716-2, and application layer partition D:\ 718-2. The active archive 700-3 may have an active archive HOM 724 and an active archive LOM 726. In alternative embodiments, each application layer partition 712-2, 714-2, 716-2, or 718-2 also contains an application layer partition HOM 728-1, 728-2, 728-3, 728-4 and an application layer partition LOM 730-1, 730-2, 730-3, 730-4. The application layer partition HOM 728 and an application layer partition LOM 730 can perform the same function as the active archive HOM 724 and the active archive LOM 726 but on an application layer partition-by-application layer partition basis. In embodiments, the one or more application layer partitions 712-2, 714-2, 716-2, or 718-2 do not include all the storage available in the active archive 700-3 and there remains unused "free space" 732.

Figure 8A:
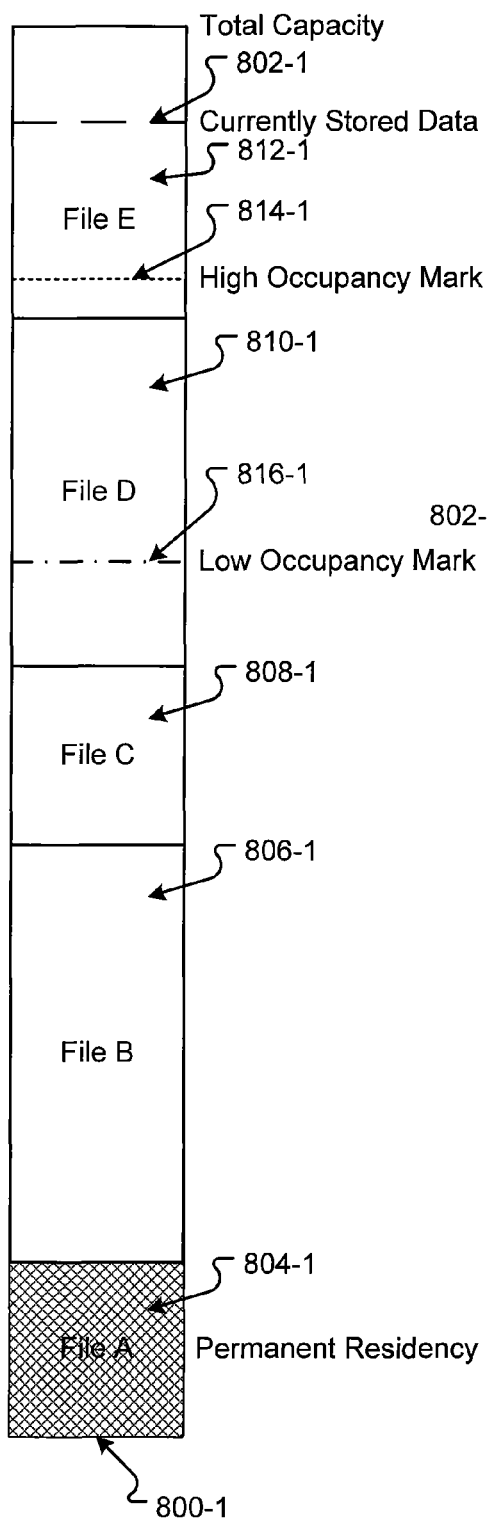
FIGS. 8A-B are yet other bar diagrams of embodiments of an archiving system showing stubbing of files to reduce storage usage in the archiving system.
Figure 8B:
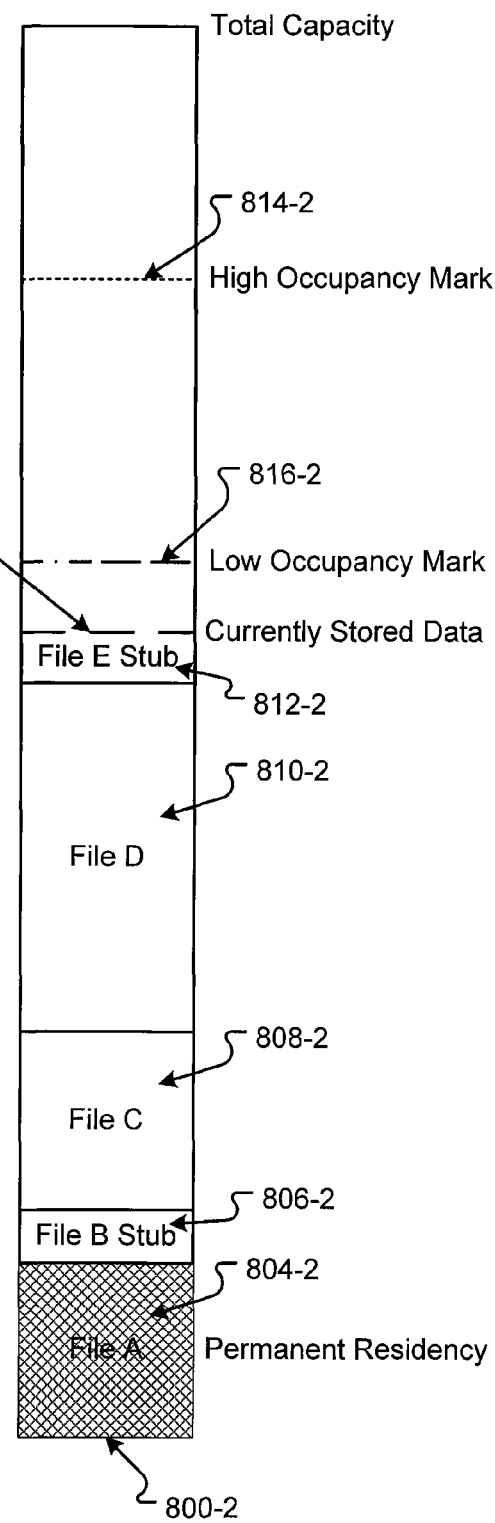

Further embodiments of the active archive 800 are shown in FIGS. 8A-B. The bar diagrams in FIGS. 8A and 8B may represent the entire active archive 800 or an application layer partition within the active archive 800. The bar diagrams also show the active archive 800-1 before data is eliminated from the active archive 800-1 and after data has been eliminated from the active archive 800-2. In embodiments, the archive data is eliminated by replacing data with a stub file.

The total amount of data stored in the active archive or application layer partition 800-1 is represented by line 802. The total amount of storage may be a sequential set of data or may be, as shown in the example in FIGS. 8A and 8B, a set of files stored in the active archive or application layer partition 800. In the exemplary embodiment, the active archive 800-1 stores five (5) files: file A 804, file B 806, file C 808, file D 810, and file E 812. The files, in embodiments, each include a file identifier, file attributes, and file data.

In embodiments, the active archive or application layer partition 800 includes a HOM 814 and a LOM 816. To reduce the amount of storage being used in the active archive or application layer partition 800-1, one or more of the files 804, 806, 808, 810, or 812 has data eliminated such that the total storage 802 is below the HOM 814. As such, each file is analyzed to determine which file may have data eliminated and replaced with a stub file. In embodiments, a stub file provides the file identifier and, in embodiments, one or more file attributes but does not include the archived data. Embodiments of methods for determining which files to stub are described in conjunction with FIGS. 10-11.

One or more files, in embodiments, are determined to have archived data eliminated. In the exemplary embodiment, file A 804-2 is determined to be permanent residency data and is not altered. File C 808-2 and file D 810-2, while not permanent residency data, are determined to not be altered. In contrast, file B 806-2 and file E 812-2 have a file stub replace the preexisting file 806-1 and 812-1. As can be seen in the example, the amount of storage used by the file B 806-2 and file E 812-2 is greatly reduced. The total storage used 802-2 is below the LOM 816-2 by stubbing just the two files, file B 806-2 and file E 812-2. Again, it should be noted that the above process of reducing data storage can be used in either the active archive or in an application layer partition of the active archive.

Figure 9:
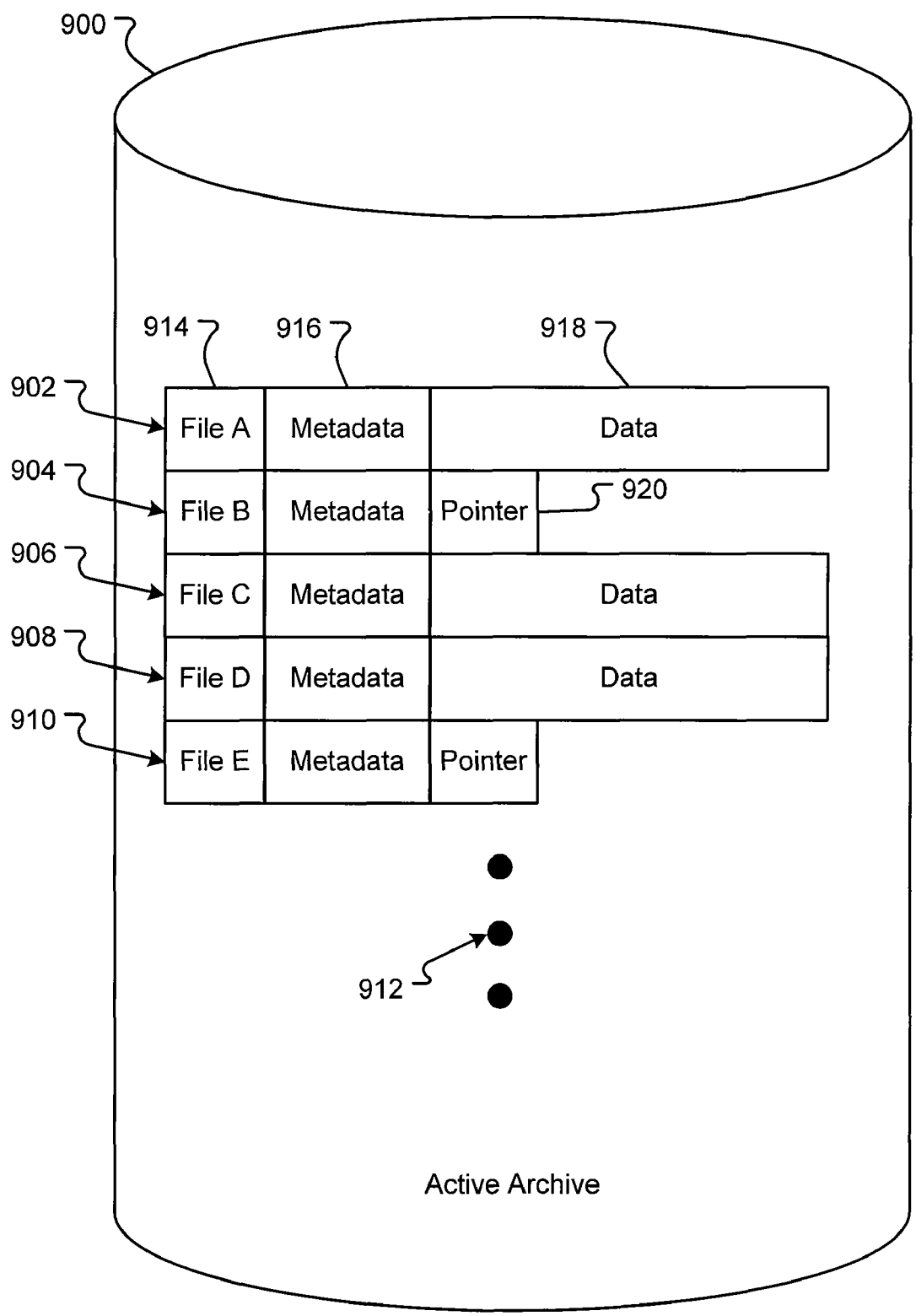
FIG. 9 is a block diagram of an embodiment of a database and one or more data structures for stubbing files in an archiving system.

An embodiment of an active archive 900 having one or more data structures for one or more stubbed files is shown in FIG. 9. In the example presented in FIG. 9, there are five data structures 902, 904, 906, 908, and 910 that represent files stored in an active archive 900 that are associated with the files 804-2, 806-2, 808-2, 810-2, or 812-2 in FIG. 8B. There may be fewer files than those shown in the exemplary active archive 900 or one or more other files may exist in the active archive 900 as represented by the ellipses 912.

In embodiments, a file data structure 902 may comprise a file identifier 914, file metadata 916, and file data 918. A file identifier 914 may be any identifier of the file, for example a file GUID. The file metadata 916, in embodiments, includes the information or attributes about the file, for example, the file size, file location, file save date and time, file creation date and time, file creator, etc. File data 918 can include the archived data sent from the application server. In embodiments, file A 902, file C 906 and file D 908 include file data.

File B 904 and file E 910, in embodiments, have been converted into stub files. In embodiments, a stub file has at least a portion of the file data eliminated. The archival management system 310-1 (FIG. 3) or the active archive system 314-1 (FIG. 3) may create the stub files. In one embodiment, the file data is replaced with a pointer 920, which provides a link or other information to retrieve the file from another location, for example, the RDA 232-1 (FIG. 2). In other embodiments, the file data is eliminated without replacing the file data with a pointer 920. Other parts of the file may also be eliminated, for example, the file metadata and/or the file identifier. If the file identifier or file metadata is eliminated, a record of the file, in embodiments, is recorded in the database 318-1 (FIG. 3) to ensure that the archival management system 310-1 (FIG. 3) does not search for the file in the active archive 900.

Figure 10:
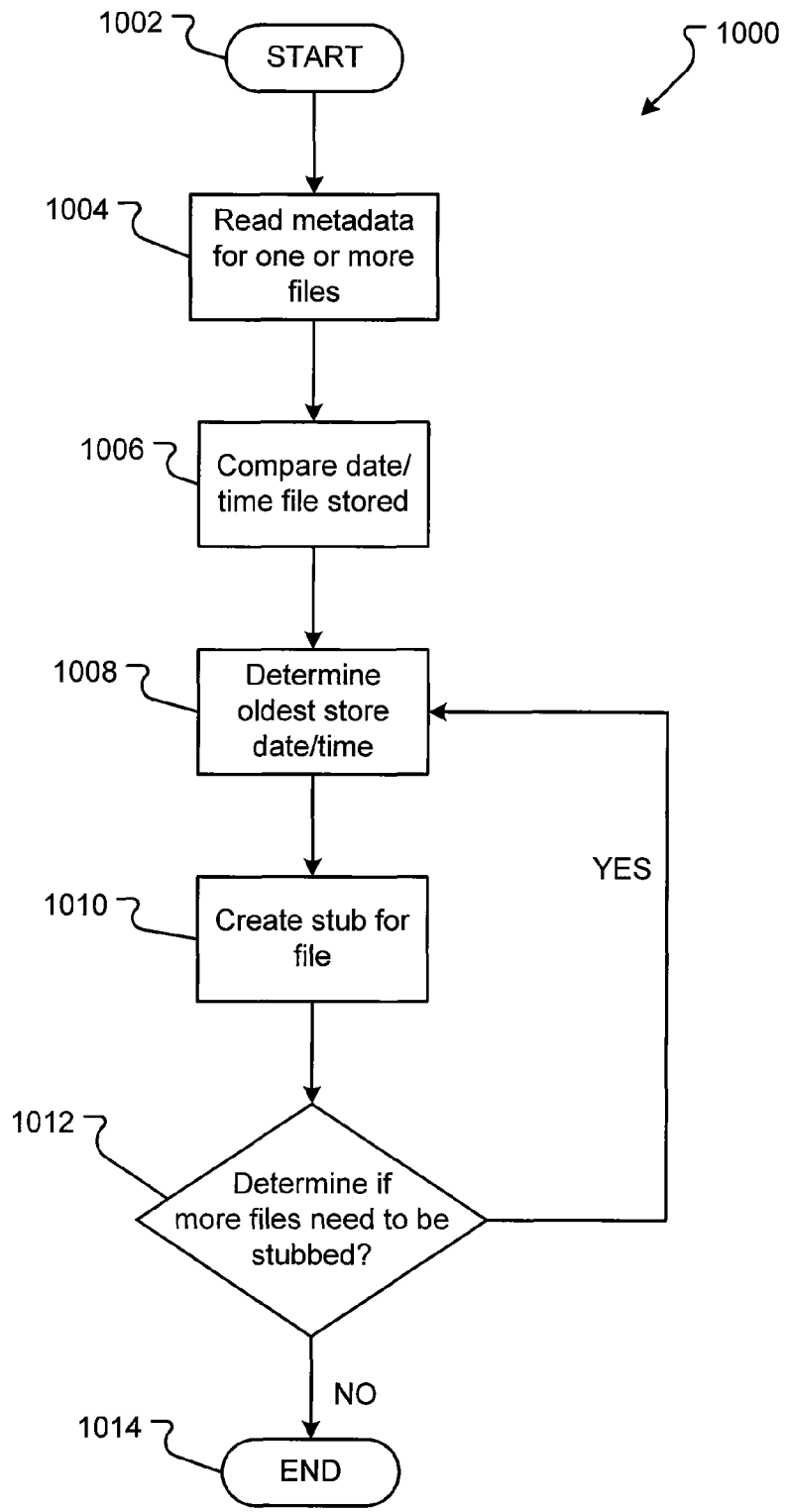
FIG. 10 is a flow diagram of an embodiment of a method for stubbing files in an archiving system.

An embodiment of a method 1000 for creating stub files is shown in FIG. 10. In embodiments, the method generally begins with a START operation 1002 and terminates with an END operation 1014. The steps shown in the method 1000 may be executed in a computer system as a set of computer executable instructions. While a logical order is shown in FIG. 10, the steps shown or described can, in some circumstances, be executed in a different order than presented herein.

Read operation 1004 reads the metadata for one or more files. In embodiments, the archival management system 310-1 (FIG. 3) determines that files need to be stubbed. The archival management system 310-1 (FIG. 3) can read the metadata 916 (FIG. 9) for one or more files 902 (FIG. 9), 904 (FIG. 9), 906 (FIG. 9), 908 (FIG. 9), and 910 (FIG. 9). In embodiments, the archival management system 310-1 (FIG. 3) stores the metadata 916 (FIG. 9) or portions of the metadata 916 (FIG. 9) into a temporary memory structure for future operations.

Compare operation 1006 compares at least a portion of the metadata. In one embodiment, the archival management system 310-1 (FIG. 3) accesses the temporary memory structure containing the metadata 916 (FIG. 9) and compares the date and/or time that the file was stored in the active archive 900 (FIG. 9) for the several files 902 (FIG. 9), 904 (FIG. 9), 906 (FIG. 9), 908 (FIG. 9), and 910 (FIG. 9). Determine operation 1008 determines which file has the earliest storage date and/or time. In embodiments, the archival management system 310-1 (FIG. 3) compares a first save date and/or time for a first file 902 (FIG. 9) to a second save date and/or time for a second file 904 (FIG. 9). The file with the older save date and/or time is kept and compared to a third file's 906 (FIG. 9) save date and/or time. This process of walking through the files continues until no further files are available for comparison. The remaining file is determined to have the oldest save date and/or time. As one skilled in the art will recognize, other methods for comparing the files are possible and contemplated.

Create operation 1010 creates a stub file for the file with the oldest save date and/or time. The archival management system 310-1 (FIG. 3), in embodiments, replaces the file data 918 (FIG. 9) with a pointer 920 (FIG. 9). The pointer 920 (FIG. 9) includes less data than the file data 918 (FIG. 9). In other embodiments, the archival management system 310-1 (FIG. 3) erases all the file data 918 (FIG. 9) without replacing the file data 918 (FIG. 9) with a pointer 920 (FIG. 9). In still other embodiments, the archival management system 310-1 (FIG. 3) erases the entire file 902 (FIG. 9) and records the action into the database 318-1 (FIG. 3) for later determination that the file has been stubbed. The archival management system 310-1 (FIG. 3) may also erase other parts of the file 902 (FIG. 9), such as the metadata 916 (FIG. 9).

Determine operation 1012 determines if another file needs to be stubbed. In embodiments, the archival management system 310-1 (FIG. 3) determines if the currently stored data 802 (FIG. 8) is below a LOM 816 (FIG. 8), as explained in conjunction with FIGS. 12-14. If there are more files that need to be stubbed, the method flows YES back to determine operation 1008. If there are no more files that need to be stubbed, the method flows NO to terminate 1014.

Figure 11:
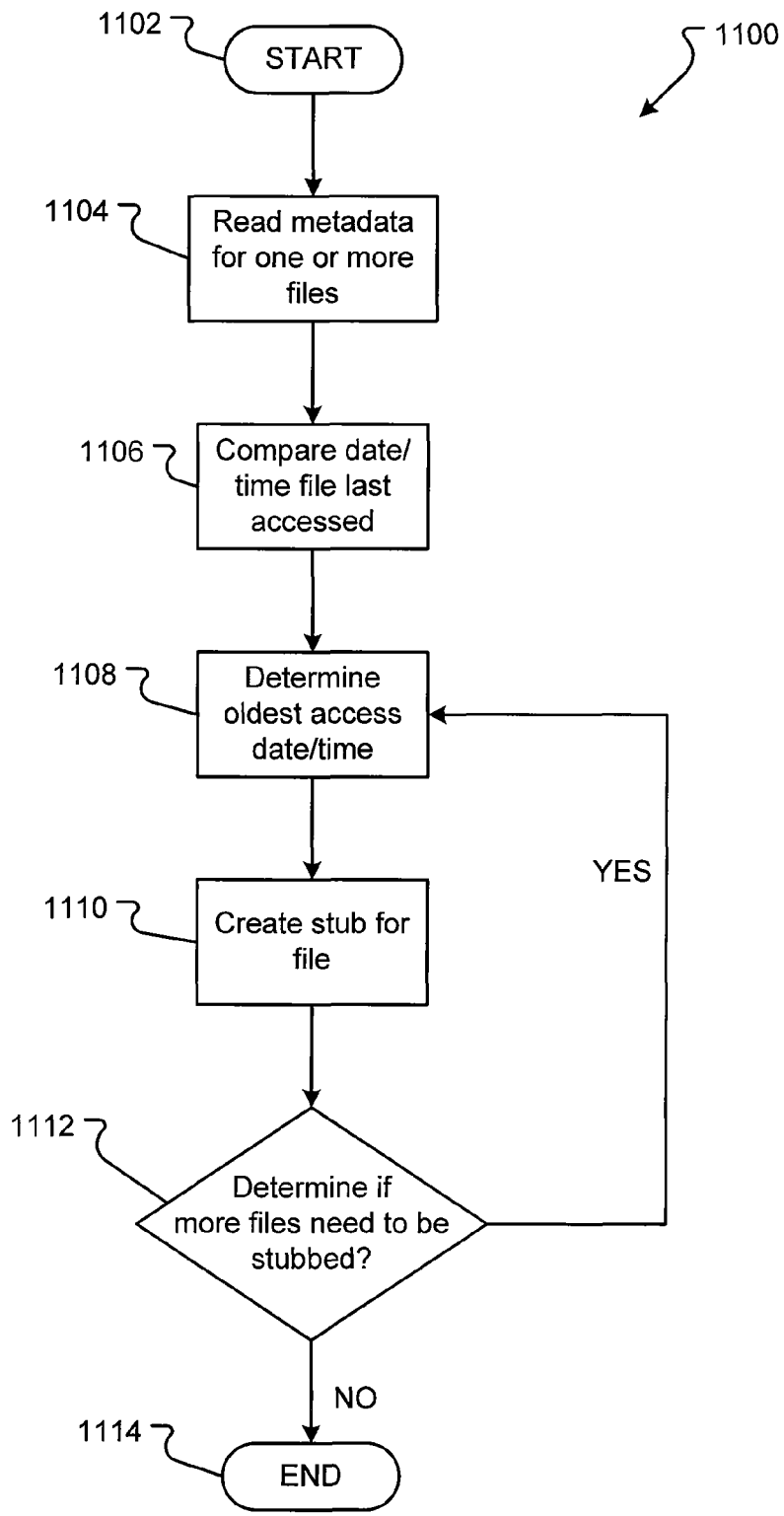
FIG. 11 is another flow diagram of an embodiment of a method for stubbing files in an archiving system.

Another embodiment of a method 1100 for creating stub files is shown in FIG. 11. In embodiments, the method 1100 generally begins with a START operation 1102 and terminates with an END operation 1114. The steps shown in the method 1100 may be executed in a computer system as a set of computer executable instructions. While a logical order is shown in FIG. 11, the steps shown or described can, in some circumstances, be executed in a different order than presented herein.

Read operation 1104, as with read operation 1004 (FIG. 10), reads the metadata for one or more files. In embodiments, the archival management system 310-1 (FIG. 3) determines that files need to be stubbed. The archival management system 310-1 (FIG. 3) can read the metadata 916 (FIG. 9) for one or more files 902 (FIG. 9), 904 (FIG. 9), 906 (FIG. 9), 908 (FIG. 9), and 910 (FIG. 9). In embodiments, the archival management system 310-1 (FIG. 3) stores the metadata 916 (FIG. 9) or portions of the metadata 916 (FIG. 9) into a temporary memory structure for future operations.

Compare operation 1106 compares at least a portion of the metadata. In one embodiment, the archival management system 310-1 (FIG. 3) accesses the temporary memory structure containing the metadata 916 (FIG. 9) and compares the date and/or time that the file was last accessed in the active archive 900 (FIG. 9) for the several files 902 (FIG. 9), 904 (FIG. 9), 906 (FIG. 9), 908 (FIG. 9), and 910 (FIG. 9). Determine operation 1008 determines the earliest file access time. In embodiments, the archival management system 310-1 (FIG. 3) compares a last access date and/or time for a first file 902 (FIG. 9) to a last access date and/or time for a second file 904 (FIG. 9). The file with the older last access date and/or time is kept and compared to a third file's 906 (FIG. 8) last access date and/or time. This process of walking through the files continues until no further files are available for comparison. The remaining file is determined to have the oldest last access date and/or time. As one skilled in the art will recognize, other methods for comparing the files are possible and contemplated.

Create operation 1110 creates a stub file for the file with the oldest last access date and/or time. The archival management system 310-1 (FIG. 3), in embodiments, replaces the file data 918 (FIG. 9) with a pointer 920 (FIG. 9). The pointer 920 (FIG. 9) includes less data than the file data 918 (FIG. 9). In other embodiments, the archival management system 310-1 (FIG. 3) erases all the file data 918 (FIG. 9) without replacing the file data 918 (FIG. 9) with a pointer 920 (FIG. 9). In still other embodiments, the archival management system 310-1 (FIG. 3) erases the entire file 902 (FIG. 9) and records the action into the database 318-1 (FIG. 3) for later determination that the file has been stubbed. The archival management system 310-1 (FIG. 3) may also erase other parts of the file 902 (FIG. 9), such as the metadata 916 (FIG. 9).

Determine operation 1112 determines if another file needs to be stubbed. In embodiments, the archival management system 310-1 (FIG. 3) determines if the currently stored data 802 (FIG. 8) is below a LOM 816 (FIG. 8), as explained in conjunction with FIGS. 12-14. If there are more files that need to be stubbed, the method flows YES back to determine operation 1108. If there are no more files that need to be stubbed, the method flows NO to terminate 1114.

Figure 12:
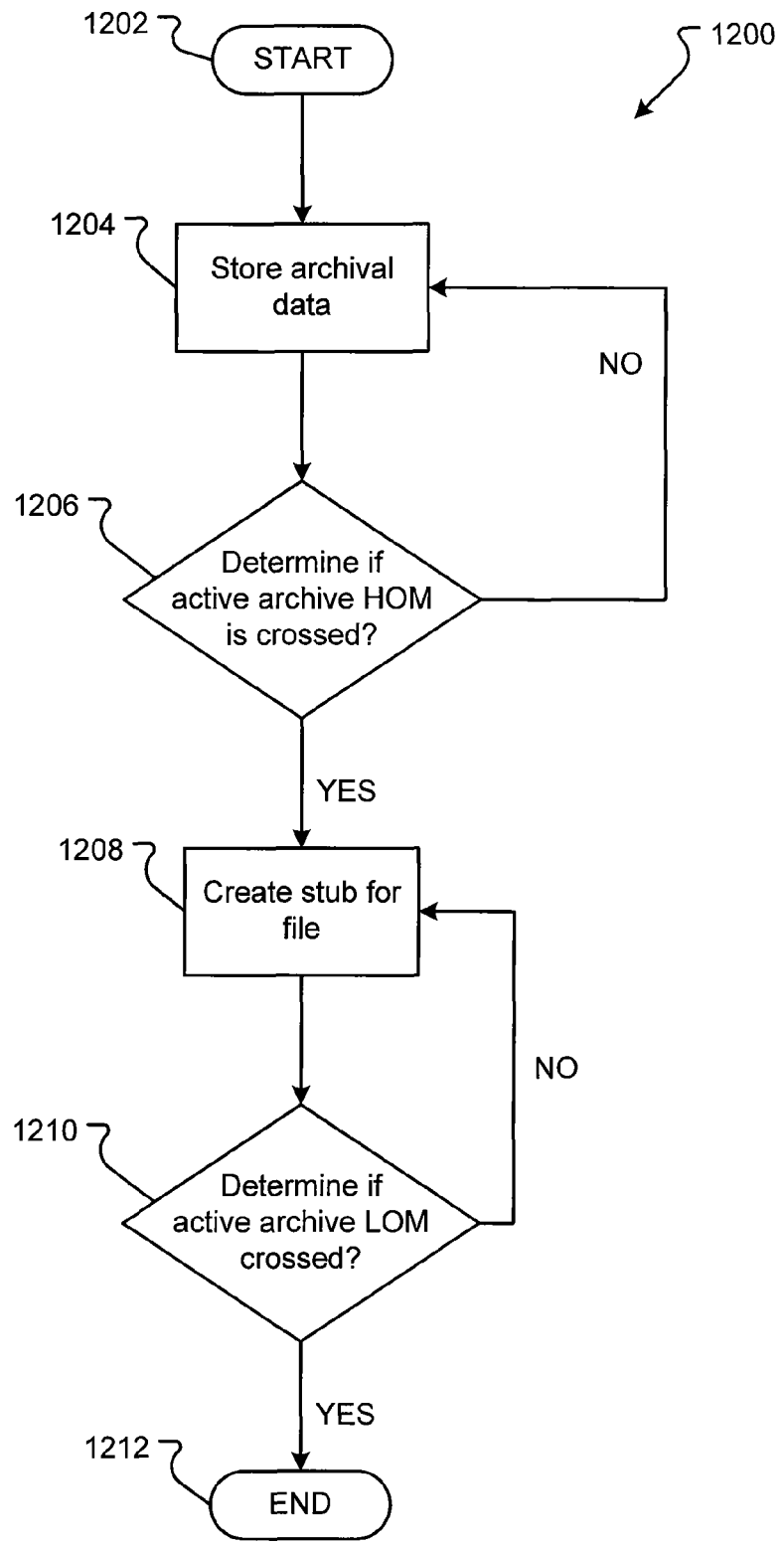
FIG. 12 is a flow diagram of an embodiment of a method for determining if stubbing is required in the archiving system.

An embodiment of a method 1200 for determining if one or more stub files should be created is shown in FIG. 12. In embodiments, the method 1200 generally begins with a START operation 1202 and terminates with an END operation 1212. The steps shown in the method 1200 may be executed in a computer system as a set of computer executable instructions. While a logical order is shown in FIG. 12, the steps shown or described can, in some circumstances, be executed in a different order than presented herein.

Store operation 1204 stores archival data. In embodiments, the archival management system 310-1 (FIG. 3) receives archival data from an application server 306 (FIG. 3) and stores the archival data in the active archive 314-1 (FIG. 3).

Determine operation 1206 determines if the active archive HOM has been crossed. The archival management system 310-1 (FIG. 3), in embodiments, compares the percentage of storage used by the currently stored data 802-1 (FIG. 8A) with the active archive HOM 814-1 (FIG. 8A) or 708 (FIG. 7A). In embodiments, the archival management system 310-1 (FIG. 3) makes the comparison after every store operation 1204. In alternative embodiments, the archival management system 310-1 (FIG. 3) makes the comparison periodically, for example, every day, every week, etc. If the percentage of storage used by the currently stored data 802-1 (FIG. 8A) is more than the percentage set for the active archive HOM 814-1 (FIG. 8A), the method flows YES to create operation 1208. If the percentage of storage used by the currently stored data 802-1 (FIG. 8A) is not more than the percentage set for the active archive HOM 814-1 (FIG. 8A), the method flows NO back to store operation 1204 to store more archival data in the active archive.

Create operation 1208 creates at least one stub file. In embodiments, the archival management system 310-1 (FIG. 3) determines one file in the active archive to eliminate one or more portions of the file. The creation of the stub file may be as explained in conjunction with FIGS. 10-11.

Determine operation 1210 determines if the active archive LOM has been crossed. In embodiments, the archival management system 310-1 (FIG. 3), after creating a stub file, compares the percentage of storage used by the currently stored data 802-2 (FIG. 8B) with the active archive LOM 816-2 (FIG. 8B). The archival management system 310-1 (FIG. 3) may make the comparison after making each stub file or, in other embodiments, may make the comparison after creating two or more stub files. If the percentage of storage used by the currently stored data 802-2 (FIG. 8B) is more than the percentage set for the active archive LOM 816-2 (FIG. 8B), the method flows NO back to create operation 1208. If the percentage of storage used by the currently stored data 802-2 (FIG. 8B) is not more than the percentage set for the active archive LOM 816-2 (FIG. 8B), the method flows YES to terminate 1212.

Figure 13:
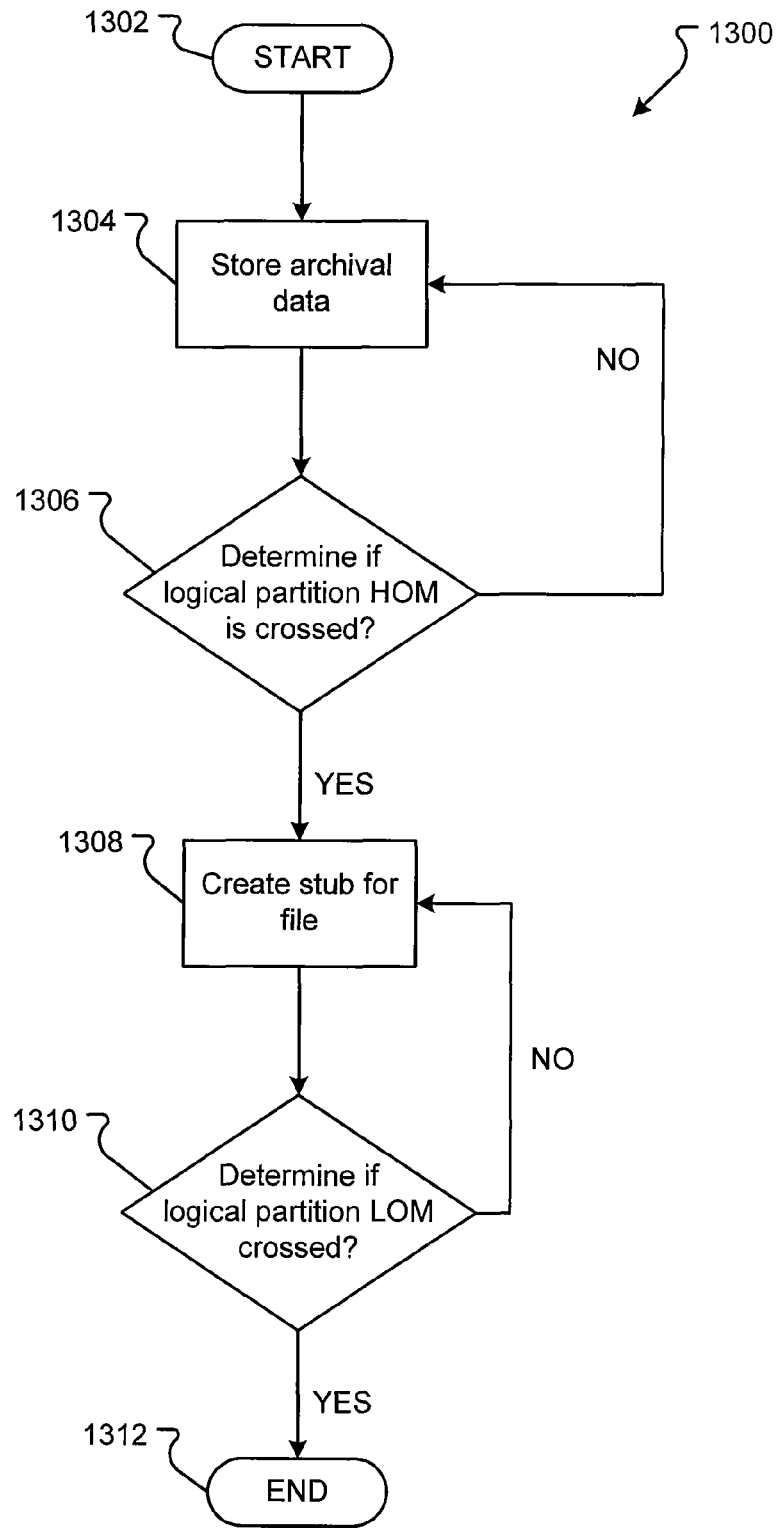
FIG. 13 is another flow diagram of an embodiment of a method for determining if stubbing is required in the archiving system.

Another embodiment of a method 1300 for determining if one or more stub files should be created is shown in FIG. 13. In embodiments, the method 1300 generally begins with a START operation 1302 and terminates with an END operation 1312. The steps shown in the method 1300 may be executed in a computer system as a set of computer executable instructions. While a logical order is shown in FIG. 13, the steps shown or described can, in some circumstances, be executed in a different order than presented herein.

Store operation 1304 stores archival data. In embodiments, the archival management system 310-1 (FIG. 3) receives archival data from an application server 306 (FIG. 3) and stores the archival data in an application layer partition 712-1 (FIG. 7B).

Determine operation 1306 determines if the application layer partition HOM has been crossed. The archival management system 310-1 (FIG. 3), in embodiments, compares the percentage of storage used by the currently stored data 802-1 (FIG. 8A) with the application layer partition HOM 814-1 (FIG. 8A) or 728-1 (FIG. 7C). In embodiments, the archival management system 310-1 (FIG. 3) makes the comparison after every store operation 1304 into the application layer partition. In alternative embodiments, the archival management system 310-1 (FIG. 3) makes the comparison periodically, for example, every day, every week, etc. If the percentage of storage used by the currently stored data 802-1 (FIG. 8A) is more than the percentage set for the application layer partition HOM 814-1 (FIG. 8A), the method flows YES to create operation 1308. If the percentage of storage used by the currently stored data 802-1 (FIG. 8A) is not more than the percentage set for the application layer partition HOM 814-1 (FIG. 8A), method flows NO back to store operation 1304 to store more archival data in the application layer partition of the active archive.

Create operation 1308 creates a stub file. In embodiments, the archival management system 310-1 (FIG. 3) determines at least one file in the application layer partition to eliminate one or more portions of the file. The creation of the stub file may be as explained in conjunction with FIGS. 10-11.

Determine operation 1310 determines if the application layer partition LOM has been crossed. In embodiments, the archival management system 310-1 (FIG. 3), after creating a stub file, compares the percentage of storage used by the currently stored data 802-1 (FIG. 8A) with the application layer partition LOM 816-1 (FIG. 8A) or 730-1 (FIG. 7C). The archival management system 310-1 (FIG. 3) may make the comparison after making each stub file in the application layer partition or, in other embodiments, may make the comparison after creating two or more stub files. If the percentage of storage used by the currently stored data 802-1 (FIG. 8A) is more than the percentage set for the application layer partition LOM 816-1 (FIG. 8A), the method flows NO back to create operation 1308. If the percentage of storage used by the currently stored data 802-1 (FIG. 8A) is not more than the percentage set for the application layer partition LOM 816-1 (FIG. 8A), the method flows YES to terminate 1312.

Figure 14:
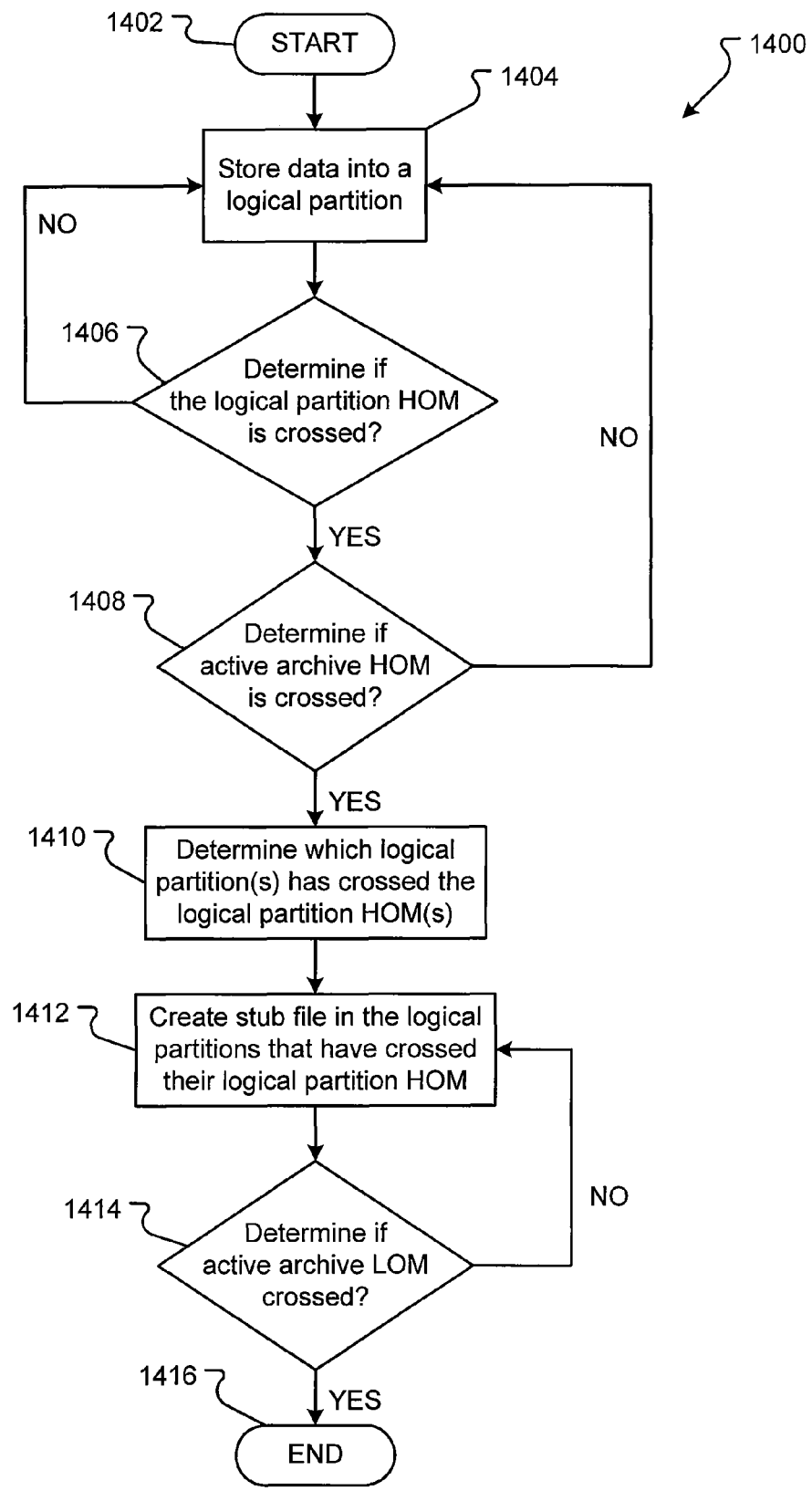
FIG. 14 is yet another flow diagram of an embodiment of a method for determining if stubbing is required in the archiving system.

Still another embodiment of a method 1400 for determining if one or more stub files should be created is shown in FIG. 14. In embodiments, the method 1400 generally begins with a START operation 1402 and terminates with an END operation 1416. The steps shown in the method 1400 may be executed in a computer system as a set of computer executable instructions. While a logical order is shown in FIG. 14, the steps shown or described can, in some circumstances, be executed in a different order than presented herein.

Store operation 1404 stores archival data into an application layer partition. In embodiments, the archival management system 310-1 (FIG. 3) receives archival data from an application server 306 (FIG. 3) and stores the archival data in the application layer partition 712-1 (FIG. 7B).

Determine operation 1406 determines if the application layer partition HOM has been crossed. The archival management system 310-1 (FIG. 3), in embodiments, compares the percentage of storage used by the currently stored data 802-1 (FIG. 8A) with the application layer partition HOM 814-1 (FIG. 8A) or 728-1 (FIG. 7C). In embodiments, the archival management system 310-1 (FIG. 3) makes the comparison after every store operation 1404 into the application layer partition. In alternative embodiments, the archival management system 310-1 (FIG. 3) makes the comparison periodically, for example, every day, every week, etc. If the percentage of storage used by the currently stored data 802-1 (FIG. 8A) is more than the percentage set for the application layer partition HOM 814-1 (FIG. 8A), the method flows YES to determine operation 1408. If the percentage of storage used by the currently stored data 802-1 (FIG. 8A) is not more than the percentage set for the application layer partition HOM 814-1 (FIG. 8A), the method flows NO back to store operation 1404 to store more archival data in the active archive.

Determine operation 1408 determines if the active archive HOM has been crossed. The archival management system 310-1 (FIG. 3), in embodiments, compares the percentage of storage used by the currently stored data 802-1 (FIG. 8A) with the active archive HOM 814-1 (FIG. 8A) or 708 (FIG. 7A). In embodiments, the archival management system 310-1 (FIG. 3) makes the comparison after every store operation 1404. In alternative embodiments, the archival management system 310-1 (FIG. 3) makes the comparison periodically, for example, every day, every week, etc. If the percentage of storage used by the currently stored data 802-1 (FIG. 8A) is more than the percentage set for the active archive HOM 814-1 (FIG. 8A), the method flows YES to determine operation 1410. If the percentage of storage used by the currently stored data 802-1 (FIG. 8A) is not more than the percentage set for the active archive HOM 814-1 (FIG. 8A), the method flows NO back to store operation 1404 to store more archival data in the active archive.

Determine operation 1410 determines which application layer partitions have crossed their application layer partition HOM. The archival management system 310-1 (FIG. 3), in embodiments, again compares the percentage of storage used by the currently stored data 802-1 (FIG. 8A) with the application layer partition HOM 814-1 (FIG. 8A) or 728-1 (FIG. 7C). In other embodiments, if the archival management system 310-1 (FIG. 3), in determine operation 1406, determines that the application layer partition 712-1 (FIG. 7B) is over the application layer partition HOM 728-1 (FIG. 7C), the archival management system 310-1 (FIG. 3) records an indicator (not shown) identifying the application layer partition 712-1 (FIG. 7B) as over the application layer partition HOM 728-1 (FIG. 7C). The archival management system 310-1 (FIG. 3) can then retrieve this information during determine operation 1410. The record may be an identifier for the application layer partition 712-1 (FIG. 7B) and/or a flag representing that the application layer partition 712-1 (FIG. 7B) is over the application layer partition HOM 728-1 (FIG. 7C).

Create operation 1412 creates a stub file in at least one of the application layer partitions that is over the application layer partition HOM. In embodiments, the archival management system 310-1 (FIG. 3) determines one file in one of the application layer partitions to eliminate one or more portions of the file. The creation of the stub file may be as explained in conjunction with FIGS. 10-11.

Determine operation 1414 determines if the active archive LOM has been crossed. In embodiments, the archival management system 310-1 (FIG. 3), after creating a stub file, compares the percentage of storage used by the currently stored data 802-1 (FIG. 8A) with the active archive LOM 816-1 (FIG. 8A). The archival management system 310-1 (FIG. 3) may make the comparison after making each stub file or, in other embodiments, may make the comparison after creating two or more stub files. If the percentage of storage used by the currently stored data 802-1 (FIG. 8A) is more than the percentage set for the active archive LOM 816-1 (FIG. 8A), the method flows NO back to create operation 1412. If the percentage of storage used by the currently stored data 802-1 (FIG. 8A) is not more than the percentage set for the active archive LOM 816-1 (FIG. 8A), the method flows YES to terminate 1416.

Figure 15:
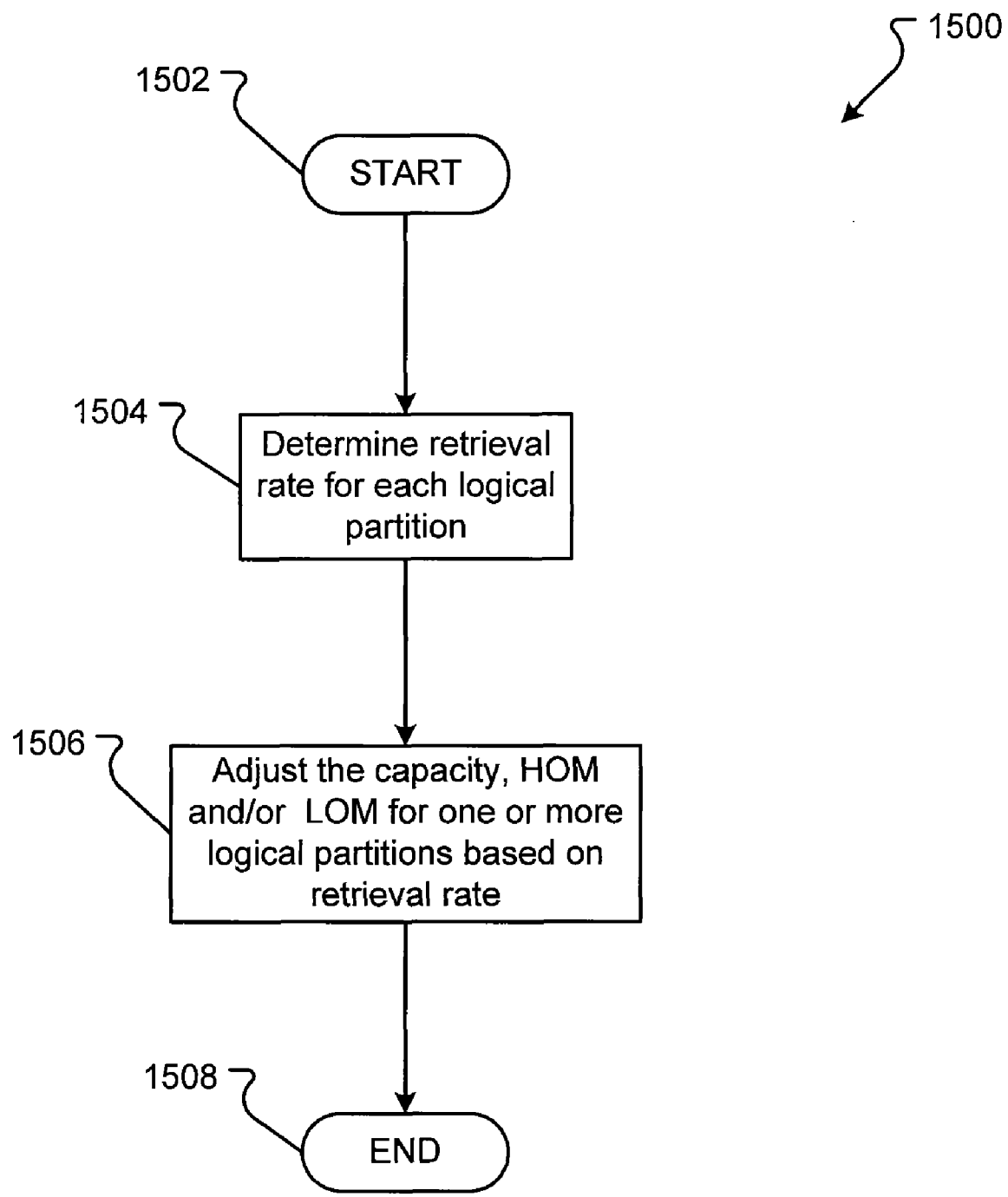
FIG. 15 is a flow diagram of an embodiment of a method for dynamically altering the amount of storage capacity in two or more application layer partitions of an archiving system.

An embodiment of a method 1500 for adjusting the application layer partition HOM and LOM is shown in FIG. 15. In embodiments, the method 1500 generally begins with a START operation 1502 and terminates with an END operation 1508. The steps shown in the method 1500 may be executed in a computer system as a set of computer executable instructions. While a logical order is shown in FIG. 15, the steps shown or described can, in some circumstances, be executed in a different order than presented herein. In embodiments, the method 1500 is a further embodiment of determine operation 1306 (FIG. 13) or determine operation 1406 (FIG. 14).

Determine operation 1504 determines the retrieval rate for one or more application layer partitions. The archival management system 310-1 (FIG. 3), in embodiments, reads the metadata 916 (FIG. 9) for files in each application layer partition to determine the frequency and timing of accesses to the archived data file 902 (FIG. 9). In other embodiments, the archival management system 310-1 (FIG. 3) accesses data about each application layer partition from the database 318-1 (FIG. 3) regarding the frequency and timing of accesses to the application layer partitions. The archival management system 310-1 (FIG. 3), from this information, determines which application layer partitions have a higher rate of retrieval, that is, the archived data in the application layer partition is accessed more frequently and/or more recently.

Adjust operation 1506 adjusts one or more of the application layer partition capacity, HOM and/or LOM for one or more application layer partitions. In embodiments, the archival management system 310-1 (FIG. 3) changes the application layer partition capacity for the application layer partitions that are accessed more frequently. For example, if application layer partition A:\ 712-2 (FIG. 7) is accessed more frequently and the active directory has free space 732 (FIG. 7), the size of application layer partition A:\ 712-2 (FIG. 7) is increased to use some or all of the free space 732 (FIG. 7). In another embodiment, archival management system 310-1 (FIG. 3) increases the size of application layer partition A:\ 712-2 (FIG. 7), which may be accessed more, and decreases the size of another application layer partition that is less often accessed. The archival management system 310-1 (FIG. 3) may also increase the size of application layer partition A:\ 712-2 (FIG. 7), which may be accessed more, and decrease the size of another application layer partition that seldom or never crosses its application layer partition HOM.

The archival management system 310-1 (FIG. 3) may also increase the HOM for the application layer partitions that are accessed more often, allowing the more-often used application layer partitions to keep more archived data. In alternative embodiments, the archival management system 310-1 (FIG. 3) decreases the LOM for application layer partitions that are accessed less often such that the application layer partitions stub more files than other application layer partitions. One or more of the changes may be applied by the archival management system 310-1 (FIG. 3). The changes allow for dynamic adjustment of the application layer partitions to compensate for different usage patterns with the application servers.

In light of the above description, a number of advantages of the embodiments are readily apparent. A single archiving system can be organized into two or more independent file systems that service two or more application servers. As such, there is no need for a separate archiving system for each application server. The flexibility offered by the embodiments helps reduce the amount of equipment needed. Further, the granularity of management for the archive is greatly enhanced because each partition may have a unique and customized set of controls. In addition, the active archive can be managed to ensure that the active archive eliminates data to ensure availability for future storage. More and other advantages will be apparent to one skilled in the art.

A number of variations and modifications of the embodiments can also be used. In alternative embodiments, the application layer partitions in the active archive also include folders, with each folder having a set of customized controls. Further, active archive data may be replaced by links, such as by object linking and embedding (OLE), to the archived data in the RDA. As such, when an application desires the data in the active archive, the request is automatically redirected to the RDA.

While the principles of the disclosure have been described above in connection with specific apparatuses and methods, it is to be clearly understood that this description is made only by way of example and not as limitation on the scope of the disclosure.

What is claimed is:

1. An archiving system for archiving data, the archiving system comprising:
   a network;
   one or more application servers in communication with the network, the application servers requiring archival of data;
   a network storage system in communication with the network to receive archival data from the one or more application servers over the network, the network storage system comprising:
      one or more drive ports; and
      one or more removable disk drives electrically connected with the one or more drive ports, the one or more removable disk drives storing the archival data received from the one or more application servers;
   an active archive, the active archive including a fixed storage;
   wherein the network storage system comprises one or more application layer partitions, wherein each application layer partition is associated with one or more drive ports and the one or more removable disk drives electrically connected to the one or more drive ports, wherein each application layer partition is also associated with a portion of the fixed storage in the active archive;
   wherein at least one of the application servers sends archival data to a predetermined application layer partition for archiving; and
   wherein the network storage system stores the sent archival data into the predetermined application layer partition in the active archive.

2. An archiving system as defined in claim 1, wherein a first application server accesses a first application layer partition, a second application server accesses a second application layer partition, and the first application server cannot access the second application layer partition.

3. The archiving system as defined in claim 1, further comprising:
   an archiving system in communication with the removable disk drives, the archiving system managing storage of the archival data; and
   an archival management system in communication with the archiving system and the active archive, the archival management system receiving the archival data from one or more application servers, the archival management system determining which application layer partition to store the archival data, the archival management system applying one or more controls to the archival data.

4. The archiving system as defined in claim 1, each application layer partition including:
   an application layer partition high occupancy mark ("HOM"), the application layer partition HOM being a first percentage of the total storage capacity of the application layer partition, wherein one or more files are stubbed if current data stored crosses over the application layer partition HOM; and
   an application layer partition low occupancy mark ("LOM"), the application layer partition LOM being a second percentage of the total storage capacity of the application layer partition, wherein the stubbing of files stops when the current data stored crosses over the application layer partition LOM.

5. The archiving system as defined in claim 1, the active archive including:
   an active archive high occupancy mark ("HOM"), the active archive HOM being a first percentage of the total storage capacity of the active archive, wherein one or more files are stubbed if current data stored crosses over the active archive HOM; and
   an active archive low occupancy mark ("LOM"), the active archive LOM being a second percentage of the total storage capacity of the active archive, wherein the stubbing of files stops when the current data stored crosses over the active archive LOM.

* * * * *